US012476360B2

(12) United States Patent
Eom

(10) Patent No.: US 12,476,360 B2
(45) Date of Patent: Nov. 18, 2025

(54) ANTENNA ELEMENT AND ARRAY ANTENNA AND OPERATING METHOD THEREOF

(71) Applicant: ELECTRONICS AND TELECOMMUNICATIONS RESEARCH INSTITUTE, Daejeon (KR)

(72) Inventor: Soon Young Eom, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 1002 days.

(21) Appl. No.: 17/519,643

(22) Filed: Nov. 5, 2021

(65) Prior Publication Data

US 2022/0149522 A1 May 12, 2022

(30) Foreign Application Priority Data

Nov. 6, 2020 (KR) ........................ 10-2020-0148138
May 7, 2021 (KR) ........................ 10-2021-0059204

(51) Int. Cl.
*H01Q 3/36* (2006.01)
*H01Q 1/48* (2006.01)
*H01Q 21/00* (2006.01)

(52) U.S. Cl.
CPC ................. *H01Q 3/36* (2013.01); *H01Q 1/48* (2013.01); *H01Q 21/0006* (2013.01)

(58) Field of Classification Search
CPC .. H01Q 3/30–36; H01Q 21/00; H01Q 21/065; H01Q 9/0414–9/045
See application file for complete search history.

(56) References Cited

U.S. PATENT DOCUMENTS 4,823,136 A 4/1989 Nathanson et al.
6,538,603 B1 * 3/2003 Chen ........................ H01Q 3/36 342/372

(Continued)

FOREIGN PATENT DOCUMENTS

EP 1146592 A1 10/2001
EP 2725657 A1 4/2014

(Continued)

OTHER PUBLICATIONS

"US Grants C-COM Patent for Phase Shifter Technology", Satellite Markets & Research, Nov. 20, 2018, http://www.satellitemarkets.com/productsservices/us-grants-c-com-patent-phase-shifter-technology.

(Continued)

*Primary Examiner* — Hasan Islam
(74) *Attorney, Agent, or Firm* — Rabin & Berdo, P.C.

(57) ABSTRACT

Disclosed is an antenna element in which dual orthogonal feed ports connected to a radiating element are configured to perform angular rotation feeding without using a mechanical phase shifter, an array antenna employing the antenna element, and an operating method of the array antenna. The antenna element comprises a driving radiating element formed on one side of a circuit board and having multi-feed ports, a ground plane element formed on the other side of the circuit board; multi-feed via holes formed in the ground plane element to correspond to the multi-feed ports, multi-feed via pins inserted into each of the multi-feed via holes, and a reconfigurable feed circuit configured to control a radiation pattern of the driving radiating element by applying feed signals for dual orthogonal channels having a phase difference of 90° to two feed ports selected from among the multi-feed ports.

16 Claims, 23 Drawing Sheets

(56) References Cited

U.S. PATENT DOCUMENTS

| | | | |
|---|---|---|---|
| 6,759,980 | B2 | 7/2004 | Chen et al. |
| 7,439,901 | B2 | 10/2008 | Needham et al. |
| 7,746,284 | B2 | 6/2010 | Eom et al. |
| 8,334,809 | B2 | 12/2012 | Nichols et al. |
| 10,014,563 | B2 | 7/2018 | Abdellatif et al. |
| 10,056,700 | B2 | 8/2018 | Kim et al. |
| 10,553,951 | B2 * | 2/2020 | Panther ................ H01Q 9/0478 |
| 11,152,714 | B2 | 10/2021 | Jakoby et al. |
| 11,177,550 | B2 * | 11/2021 | Choi .................... H01Q 21/061 |
| 2002/0175859 | A1 | 11/2002 | Newberg et al. |
| 2013/0076585 | A1 | 3/2013 | Kim |
| 2019/0372199 | A1 * | 12/2019 | Haridas .................... H01Q 3/30 |
| 2019/0386397 | A1 | 12/2019 | Son et al. |

FOREIGN PATENT DOCUMENTS

| | | | |
|---|---|---|---|
| JP | 3325090 | B2 | 9/2002 |
| KR | 101196260 | B1 | 11/2012 |
| KR | 1020130032506 | A | 4/2013 |
| KR | 1020160045649 | A | 4/2016 |
| KR | 101967016 | B1 | 4/2019 |
| KR | 1020190142827 | A | 12/2019 |
| KR | 102147953 | B1 | 8/2020 |
| WO | 2005048401 | A1 | 5/2005 |
| WO | 2013045267 | A1 | 4/2013 |

OTHER PUBLICATIONS

Ashok K. Agrawal et al., "Active Phased Array Antenna Development for Modern Shipboard Radar Systems", Johns Hopkins Apl Technical Digest, vol. 22, No. 4 (Oct. 2001).

Keith Benson, "Phased Array Beamforming ICs Simplify Antenna Design", Analog Dialogue 53-01, Jan. 2019.

"C-COM Reports Successful Tests Using Patent Pending Ka-BAND Phased Array Technology", May 4, 2016, C-COM Satellite Systems Inc, https://www.c-comsat.com/news/c-com-reports-successful-tests-using-patented-ka-band-phased-array-technology/.

* cited by examiner

RELATED ART (a1)

ANTENNA ELEMENT AND ARRAY ANTENNA AND OPERATING METHOD THEREOF

CLAIM FOR PRIORITY

This application claims priority to Korean Patent Application No. 2020-0148138 filed on Nov. 6, 2020 and Korean Patent Application No. 2021-0059204 filed on May 7, 2021 in the Korean Intellectual Property Office (KIPO), the entire contents of which are hereby incorporated by reference.

BACKGROUND

1. Technical Field

Example embodiments of the present invention relate to an array antenna and, more specifically, to an antenna element in which dual orthogonal feed ports connected to a radiating element are configured to perform angular rotation feeding without using a mechanical phase shifter such that a phase change of the radiating element is electrically controllable, an array antenna employing the antenna element, and an operating method of the array antenna.

2. Related Art

As shown in FIG. 1, a conventional array antenna for wireless communication and radars uses an analog or digital phase shifter in unit active channel blocks (ACBs), which are connected to a power combiner to generate a high-speed electronical beam and generates a high-speed electronical beam through radiating elements (REs) according to external control.

On the other hand, in the conventional array antenna, the cost of the phase shifter is high, and an additional phase control circuit device is required. Also, a high power amplifier or a low noise amplifier is required at an output port or an input port of the array antenna due to high insertion loss. In addition, the conventional array antenna has a problem of additional incidental costs such as the cost of a heat dissipation system to be installed due to high power consumption, and thus the price of the phased array antenna system is increasing.

In the conventional array antenna, unit sub-arrays which are phase-controllable array units have a small size to generate a wide-range electronical beam, and thus the total number of sub-arrays used in the array antenna having the same size is increased. In this case, the number of phase shifters also increases, and accordingly, the cost of circuit integration and solving heat dissipation, etc. is increased, thereby increasing the price of the entire antenna system.

Furthermore, a conventional mechanical antenna that moves the entire antenna is large and heavy and since the mechanical antenna provides low-speed mechanical beam forming, there is a disadvantage in that the target tracking performance is not good.

SUMMARY

Accordingly, example embodiments of the present invention are provided to substantially obviate one or more problems due to limitations and disadvantages of the related art.

Example embodiments of the present invention provide an inexpensive and lightweight electronic passive array antenna for obtaining a desired electrical phase change through an angular rotation switching feed method for dual orthogonal feed ports among axially symmetric multi-feed ports connected to a radiating element and an antenna element for the electronic passive array antenna.

Example embodiments of the present invention also provide an antenna element including a new angular rotation feed circuit which allows one pair of feed ports orthogonal to each other to be selected from among a plurality of feed ports disposed in an azimuthal direction and an array antenna employing the antenna element.

Example embodiments of the present invention also provide an electronic array antenna, which allows circularly polarized dual orthogonal circular polarization to be selectively generated through a feed circuit including a polarization selection switch, and an operating method of the electronic array antenna.

According to an exemplary embodiment of the present disclosure, an antenna element comprises: a driving radiating element formed on one side of a circuit board and having multi-feed ports; a ground plane element formed on the other side of the circuit board; multi-feed via holes formed in the ground plane element to correspond to the multi-feed ports; multi-feed via pins inserted into each of the multi-feed via holes; and a reconfigurable feed circuit configured to control a radiation pattern of the driving radiating element by applying feed signals for dual orthogonal channels having a phase difference of 90° to two feed ports selected from among the multi-feed ports.

The antenna element may further comprise a parasitic radiating element; and a foam spacer installed between the parasitic radiating element and the driving radiating element.

The reconfigurable feed circuit may comprise: a channel generation circuit configured to receive an input signal from a feed network connected to the reconfigurable feed circuit and generate dual orthogonal channels having a phase difference of 90°; a channel branch circuit connected to the channel generation circuit and configured to generate a plurality of first channels and a plurality of second channels; a switch arrangement circuit configured to select any one of the plurality of first channels and any one of the plurality of second channels; and a channel combining circuit connected to the switch arrangement circuit and configured to physically couple the first channel and the second channel.

The reconfigurable feed circuit may further comprise a polarization selection switch connected to an input port of the channel generation circuit and configured to select a right-hand circular polarized wave or a left-hand circular polarized wave of an input signal.

The multi-feed ports may be disposed at equally spaced positions in a radial direction or an azimuth direction of the driving radiating element having an axially symmetric structure.

The reconfigurable feed circuit may select one pair of feed ports clockwise or counterclockwise from among the multi-feed ports, electrically open the other feed ports among the multi-feed ports, and feed the one pair of feed ports at a rotation angle interval of 90° in the azimuthal direction on the basis of a center axis of the multi-feed ports such that the one pair of feed ports have an electrical phase difference of 90°.

The multi-feed ports may be disposed at equally spaced positions obtained by dividing 360° in a radial direction of the driving radiating element having an axially symmetric structure by the number of multi-feed ports. Also, a feed transmission line length from the other feed ports to an opened switching terminal of the reconfigurable feed circuit may be set to n (n is an integer) times 0.5 times a wavelength of a mean operating frequency, or a feed transmission line length from the other feed ports to a closed switching terminal of the reconfigurable feed circuit may be set to n times 0.25 times the wavelength of the mean operating frequency.

According to another exemplary embodiment of the present disclosure, an array antenna comprises: a radiation array in which a plurality of antenna elements are arranged; and a feed circuit network including a plurality of reconfigurable feed circuits separately connected to the plurality of antenna elements, wherein each of the plurality of antenna elements comprises: a driving radiating element formed on one side of a circuit board; multi-feed ports formed to the driving radiating element, and each of the plurality of reconfigurable feed circuits applies a feed signal for dual orthogonal channels having a phase difference of 90° to dual orthogonal feed ports selected from among the multi-feed ports of each of the driving radiating elements.

Each of the plurality of antenna elements may further comprise: a parasitic radiating element; and a foam spacer installed between the parasitic radiating element and the driving radiating element.

Each of the plurality of reconfigurable feed circuits may comprise: a channel generation circuit configured to receive an input signal from a feed network connected to the plurality of reconfigurable feed circuits and generate dual orthogonal channels having a phase difference of 90°; a channel branch circuit connected to the channel generation circuit and configured to generate a plurality of first channels and a plurality of second channels; a switch arrangement circuit configured to select any one of the plurality of first channels and any one of the plurality of second channels; and a channel combining circuit connected to the switch arrangement circuit and configured to physically couple the first channel and the second channel.

Each of the plurality of reconfigurable feed circuits may further comprise a polarization selection switch connected to an input port of the channel generation circuit and configured to select a right-hand circular polarized wave or a left-hand circular polarized wave of an input signal.

The array antenna may further comprise an antenna control unit configured to apply control signals for controlling operation timings of the plurality of reconfigurable feed circuits and data signals for controlling operation modes of the plurality of reconfigurable feed circuits to the plurality of reconfigurable feed circuits.

The antenna control unit may change or reconfigure one pair of orthogonal feed ports among the plurality of feed ports of each of the driving radiating elements by controlling each of the plurality of reconfigurable feed circuits, electrically open the other feed ports among the plurality of feed ports, and generate a relative phase shift due to a changed or reconfigured dual orthogonal feed.

The radiation array may have a structure in which a plurality of driving radiating elements having an M-bit ($2^M$ is the number of the plurality of feed ports) phase shifter function are arranged in a line or on a plane. Also, The antenna control unit may control phases by separately controlling the plurality of driving radiating elements and perform an electron beam scanning function through uniform or non-uniform amplitude distribution or coupling of a plurality of radiating elements performed by the plurality of reconfigurable feed circuits.

According to further another exemplary embodiment of the present disclosure, an operating method of an array antenna, comprises: applying feed signals having a phase difference of 90° to two feed ports selected from among a plurality of reconfigurable feed ports attached to each of a plurality of driving radiating elements of antenna elements; electrically opening the other feed ports which are not selected from among the plurality of reconfigurable feed ports from the driving radiating element; and generating a relative phase shift at the plurality of driving radiating elements due to a dual orthogonal feed to the plurality of reconfigurable feed ports to be controlled a phase of the array antenna through separate control of the driving radiating elements.

The operating method of an array antenna may comprise, before the applying of the feed signals, receiving an input signal from a feed network connected to a plurality of reconfigurable feed circuits and forming dual orthogonal channels having a phase difference of 90°; causing the dual orthogonal channels to branch into a plurality of first channels and a plurality of second channels; selecting one of the plurality of first channels and one of the plurality of second channels according to a predetermined rule; and generating the feed signals by physically coupling the selected first channel and the selected second channel.

The operating method of an array antenna may further comprise selecting a right-hand circular polarized wave or a left-hand circular polarized wave from an input signal.

The controlling of the phase of the array antenna may comprise applying control signals for controlling operation timings of a plurality of reconfigurable feed circuits and data signals for controlling operation modes of the plurality of reconfigurable feed circuits to the plurality of reconfigurable feed circuits.

The controlling of the phase of the array antenna may comprise changing or reconfiguring one pair of orthogonal feed ports among the plurality of feed ports of each of the driving radiating elements by controlling each of the plurality of reconfigurable feed circuits, electrically opening the other feed ports among the plurality of feed ports, and generating a relative phase shift due to a changed or reconfigured dual orthogonal feed.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
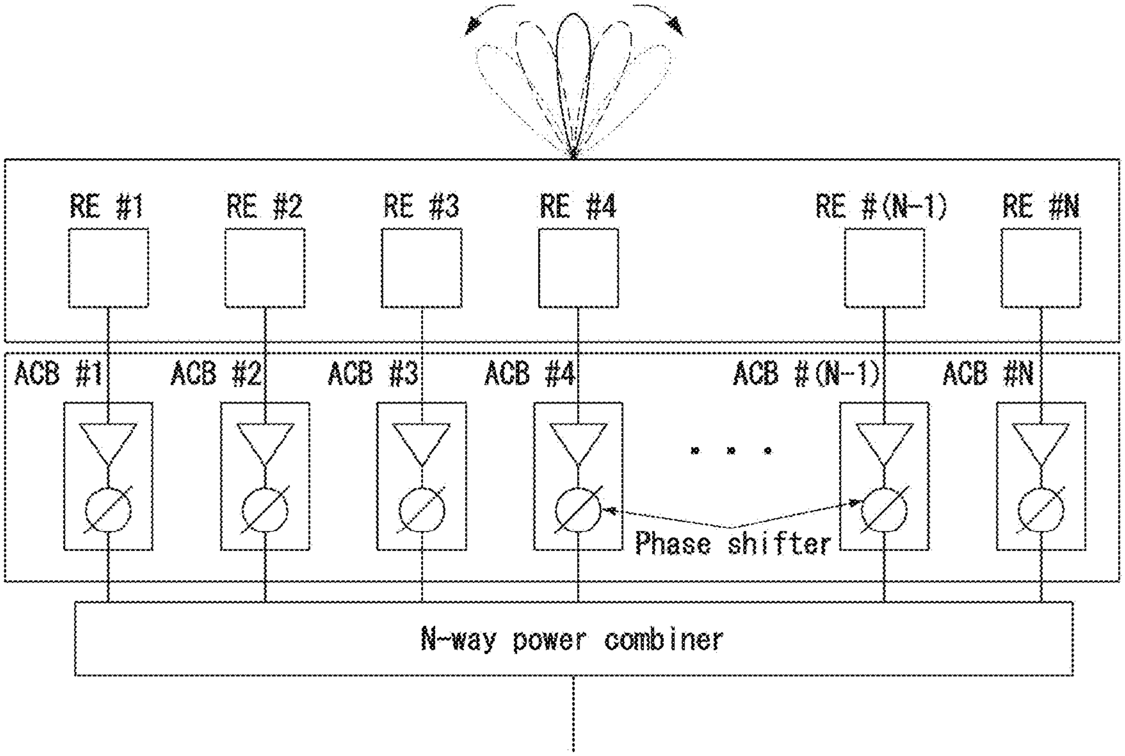
FIG. 1 is a view for describing a conventional array antenna using a phase shifter element.

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

A communication system or memory system to which example embodiments of the present invention are applied will be described. The communication system or memory system to which example embodiments of the present invention are applied is not limited to the following description, and example embodiments of the present invention may be applied to various communication systems. Here, the term "communication system" may be used synonymously with "communication network."

Hereinafter, example embodiments of the present invention will be described in detail with reference to the accompanying drawings. In describing the present invention, to facilitate overall understanding, like reference numerals refer to like elements throughout the drawings, and overlapping descriptions of identical elements will be omitted.

FIGS. 2A to 2E are diagrams illustrating an antenna element according to an example embodiment of the present invention.

Figure 2A:
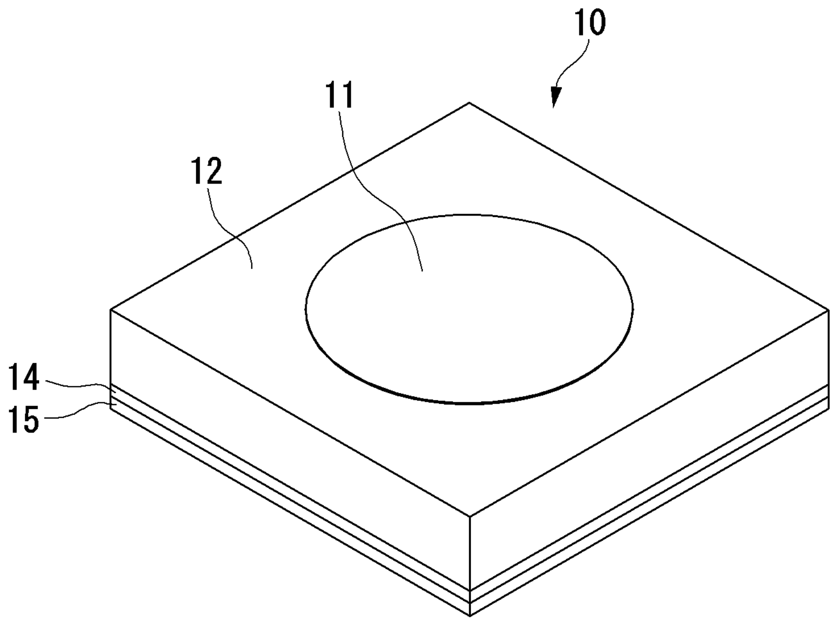
FIGS. 2A to 2E are diagrams illustrating an antenna element according to an example embodiment of the present invention.
Figure 2B:
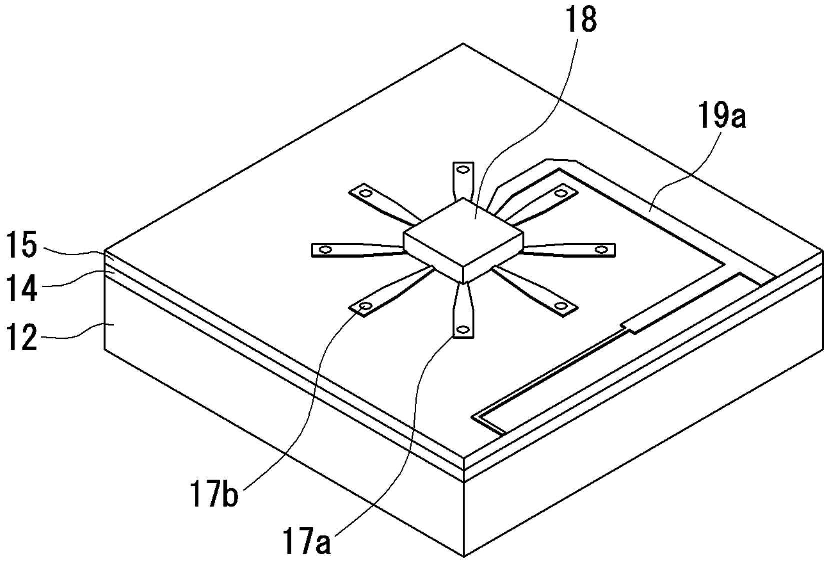
Figure 2C:
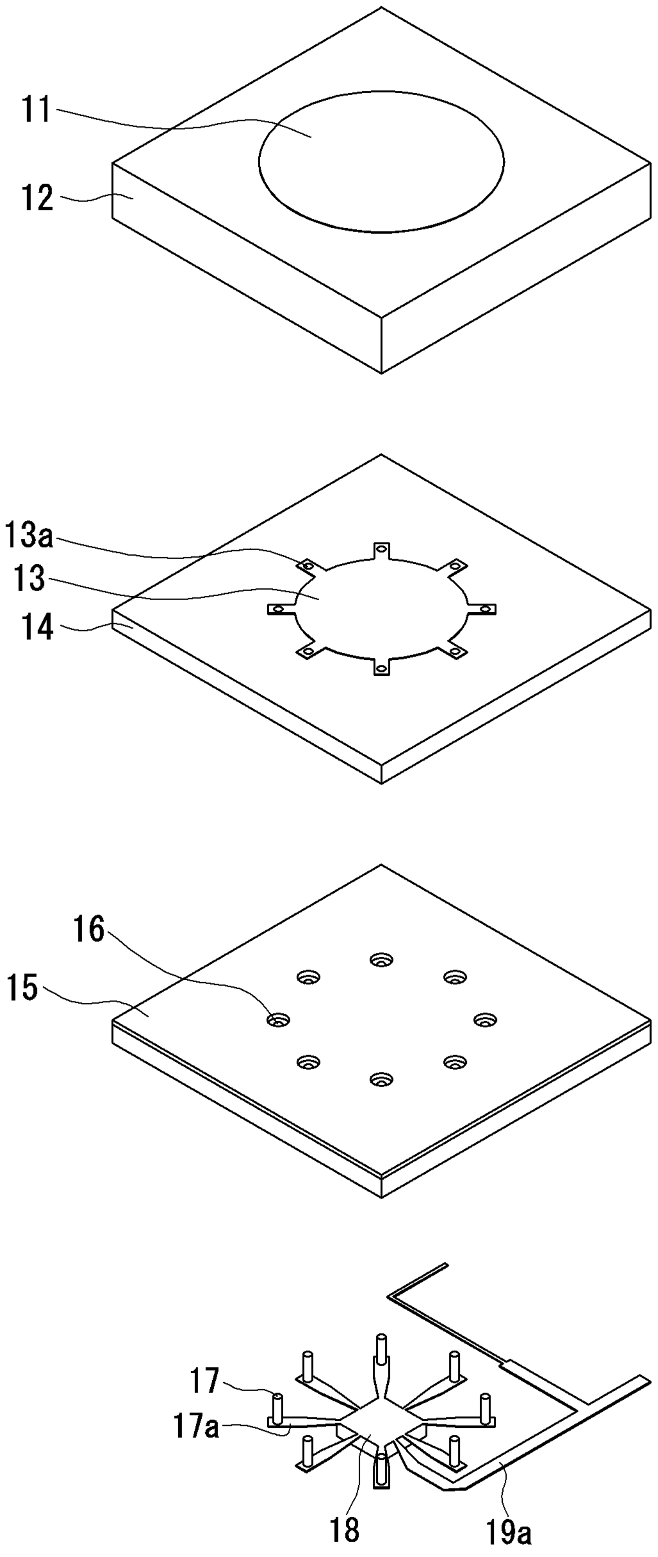
Figure 2D:
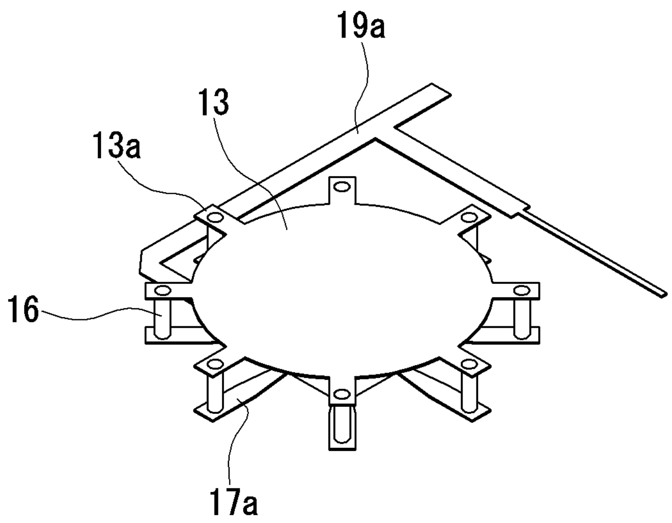
Figure 2E:
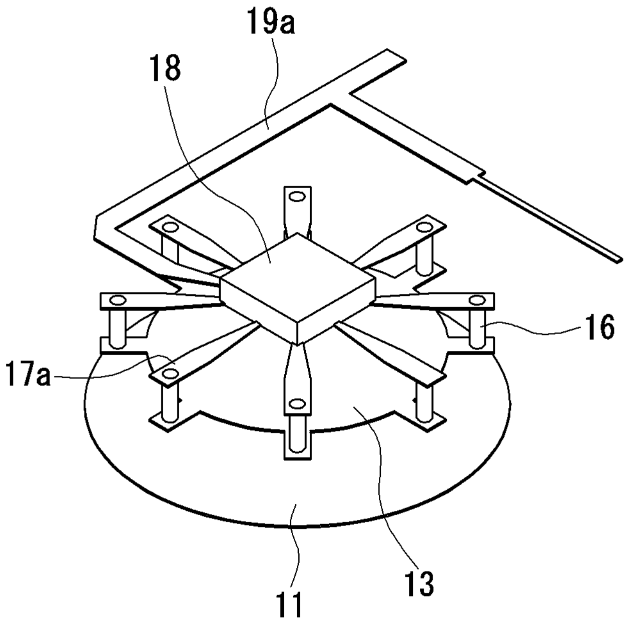

FIG. 2A is a perspective view of the antenna element, FIG. 2B is a perspective bottom view of the antenna element of FIG. 2A, FIG. 2C is an exploded perspective view of the antenna element of FIG. 2A, FIG. 2D is a perspective view showing the coupling relationship of a driving radiating element (RE), multi-feed via holes, multi-feed via pins, and a feed circuit with a foam spacer and a circuit board removed from the antenna element of FIG. 2A, and FIG. 2E is a perspective bottom view of the antenna element of FIG. 2D, that is, a perspective view of a structure to which a parasitic RE is added.

Referring to FIGS. 2A to 2E, an antenna element 10 includes a parasitic RE 11, a foam spacer 12, an operational RE 13, multi-feed ports 13*a*, a circuit board 14, a ground plane element 15, feed via holes 16, feed via pins 17, microstrip lines 17*a*, a reconfigurable feed circuit 18, and a feed line 19*a*.

In the antenna element 10, most of the components have an axially symmetric structure and use dual orthogonal feed to generate circular polarization.

The parasitic RE 11 may be formed of a conductive material in a single layer or a plurality of stacked layers and may be supported by the foam spacer 12 and the like. In this case, the parasitic RE 11 may be installed a certain distance away from the operational RE 13 due to the foam spacer 12. The parasitic RE 11 may be installed in a circular shape. However, the parasitic RE 11 is not limited thereto and may be installed in a polygonal shape or any shape formed using straight lines, curves, or a combination thereof.

A diameter of the parasitic RE 11 is the maximum diameter of the operational RE 13 but may be designed to be larger than or equal to the maximum diameter of an area surrounded by multi-feed via holes which will be described below. As a material of the parasitic RE 11, gold, silver, etc. may be used.

The parasitic RE 11 may be omitted from the operational RE 13 or used selectively. When the parasitic RE 11 is used, the antenna element 10 may obtain a wideband characteristic compared to the case of direct radiation of the operational RE 13.

The foam spacer 12 may include a dielectric, such as an air layer or the like, and may be formed of a flexible foam-based electromagnetic wave absorber with a periodic pattern. Also, as a material of the foam spacer 12, sponges, ceramics, crystalline resins, etc. may be used. Sponges are synthetic resins, such as polyurethane and soft urethane foam, or elastic spongy materials made of natural rubber and may include a viscous sponge, spongy rubber, and the like. Crystalline resins include plastics, such as polytetrafluoroethylene (PTFE), and may have properties including thermal resistance for long-term use in a high-temperature environment of 260° C. or more, electric insulation, high-frequency properties, non-adhesiveness, a low friction factor, chemical resistances, and the like. When the parasitic RE 11 is omitted, the foam spacer 12 may also be omitted from the antenna element 10.

The operational RE 13 is installed to face the parasitic RE 11 with the foam spacer 12 interposed between the operational RE 13 and the parasitic RE 11. On one side of the circuit board 14, the operational RE 13 includes a first part which is a body in the form of a disc or a circular coating layer and second parts which are protrusions protruding from the first part by a certain distance in azimuthal directions, and the second parts correspond to the multi-feed ports 13*a*.

The multi-feed ports 13*a* may be attached to the bottom of the first part of the operational RE 13 and separately disposed at equally spaced positions obtained by dividing 360° in an azimuthal direction of the operational RE 13 by the number of multi-feed ports 13*a* so that the multi-feed ports 13*a* have a symmetrical structure about the center of the first part. Due to this arrangement, the multi-feed ports 13*a* form a symmetrical multi-feed port structure about the central axis.

The circuit board 14 may include a printed circuit board (PCB), a flexible PCB, etc. having a predesigned circuit.

An adhesive layer or adhesive sheet may be additionally installed between the parasitic RE 11 and the foam spacer 12 described above, between the foam spacer 12 and the operational RE 13 described above, or between the foam spacer 12 and the circuit board 14 described above. The adhesive layer or adhesive sheet may be formed of a synthetic resin and the like and used for protecting the antenna element 10 against external impact.

The ground plane element 15 may be stacked and installed on the other side of the circuit board 14 in the form of a film or layer formed of a conductive material. Also, the ground plane element 15 may include an insulating coating layer or insulating cover layer between the ground plane element 15 and the microstrip lines 17*a* and between the ground plane element 15 and the feed line 19*a* to electrically separate the ground plane element 15 from the microstrip lines 17*a* and the feed line 19*a*.

Also, the ground plane element 15 may be formed by coating the other side of the circuit board 14 with a conductive material and a non-conductive material in the form of a plane. The ground plane element 15 may have a preset thickness.

The feed via holes 16 are installed in the ground plane element 15 and disposed to correspond to the multi-feed ports 13*a*. The feed via holes 16 may be referred to as multi-feed via holes. A diameter or height of the feed via hole 16 may be determined depending on the type or use of the antenna. The height of the feed via hole 16 may correspond to the thickness of the ground plane element 15.

The feed via pins 17 are installed by being inserted into the feed via holes 16. The feed via pins 17 may be supported by the microstrip lines 17*a* for via pins which separately extend in radial directions from the center of the reconfigurable feed circuit 18 and may be connected to one ends of the microstrip lines 17*a*. The feed via pins 17 may be multi-feed via pins corresponding to the multi-feed via holes. In other words, the multi-feed via pins may be axially symmetrically disposed at positions which are a certain distance away from the center in the radial directions.

The reconfigurable feed circuit 18 is disposed at the center of the spatial arrangement of the multi-feed via pins and connected to each of the feed via pins 17 through the microstrip lines 17*a*. An input port of the reconfigurable feed circuit 18 is connected to one end of the feed line 19*a* of a feed circuit network to receive a radio frequency (RF) input signal. Here, the feed line 19*a* may include a microstrip line or suspended line.

Also, the reconfigurable feed circuit 18 may control a feed operation of the multi-feed via pins on the basis of an RF input. To this end, the reconfigurable feed circuit 18 may include a single monolithic microwave integrated circuit (MMIC) chip which implements a polarization reconfigurable & angular phase shift control circuit function. In the single MMIC chip, a power terminal, a plurality of ground terminals, an RF signal input port, a clock signal terminal, a data signal terminal, an input offset voltage terminal, and a plurality of RF signal output ports may be integrated.

A data signal to be processed in the reconfigurable feed circuit includes data for polarization switching (hereinafter "polarization control data") and data for angular phase control (hereinafter "angular phase control data"). The data signal may be supplied or applied from an antenna control unit to the reconfigurable feed circuit 18 through an interconnection (not shown) of the circuit board 14. In addition to the data signal, the antenna control unit may apply a clock signal for synchronization or power to the reconfigurable feed circuit 18.

In a plan view, the parasitic RE 11 in a certain shape, such as a circle, is exposed from one side of the above-described antenna element 10, that is, one side of the foam spacer 12, and the antenna element 10 may have a side surface or cross-section in the form of a plate in which the ground plane element 15, the circuit board 14, and the foam spacer 12 are sequentially stacked.

Also, in a bottom view, the plurality of microstrip lines 17*a* for via pins extending in azimuthal directions may be exposed from the other side of the above-described antenna element 10, that is, one side of the ground plane element 15. Further, joining parts 17*b* with the multi-feed via pins or marks thereof may be exposed at one ends of the plurality of microstrip lines 17*a*.

The other ends of the plurality of microstrip lines 17*a* may be connected to the reconfigurable feed circuit 18 on the one side of the ground plane element 15, and the reconfigurable feed circuit 18 may be installed to protrude from the center of the plurality of microstrip lines 17*a* on the other side of the antenna element 10 by about the thickness thereof or less. Also, in the one side of the ground plane element 15, a part of the feed network, that is, the one end of the feed line 19*a*, may be connected to the RF signal input port of the reconfigurable feed circuit 18. In some modified examples, the reconfigurable feed circuit 18 may be buried in the one side of the ground plane element 15 through an additional member.

The above-described antenna element 10 may be manufactured by first stacking the circuit board 14 on which the operational RE 13 is installed and the ground plane element 15 having the feed via holes 16, stacking the foam spacer 12 in which the parasitic RE 11 is installed on the circuit board 14 having the first stack, and coupling the reconfigurable feed circuit 18, the multi-feed via pins 17 coupled to the reconfigurable feed circuit 18 through the microstrip lines 17*a*, and the feed line 19*a* coupled to the reconfigurable feed circuit 18. However, the feed line 19*a* may have a predetermined form as a part of the feed network to be connected to each of a plurality of antenna elements 10 in an array antenna element.

According to the example embodiment, it is possible to implement an antenna element which achieves a desired electrical phase change through an angular rotation feed method of dual orthogonal feed ports selected from among multi-feed ports of an axially symmetric radiating element. In other words, according to the example embodiment, it is possible to effectively provide an antenna element for an inexpensive and lightweight electronic passive array antenna.

Figure 3:
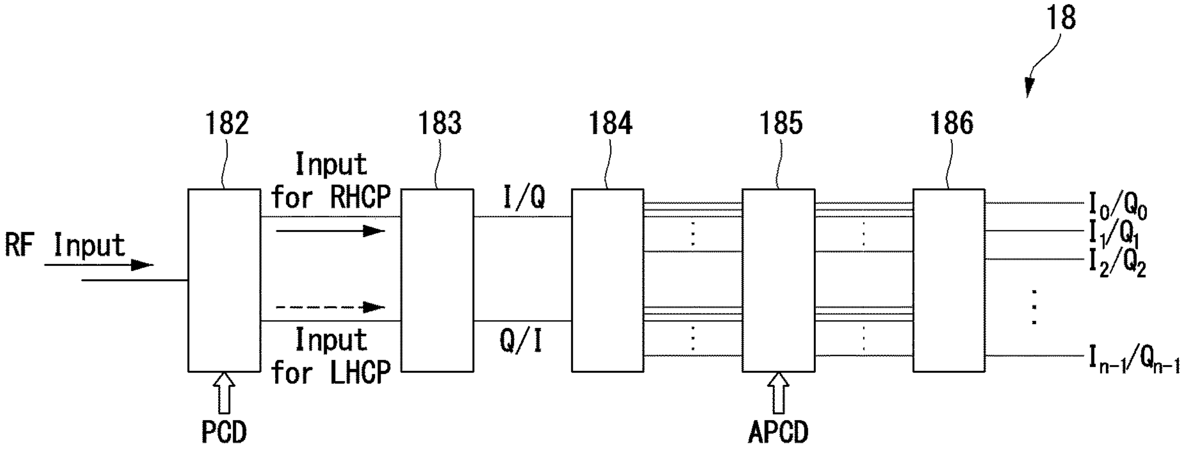
FIG. 3 is a block diagram of a configuration which may be applied to the reconfigurable feed circuit in the antenna element of FIG. 2.
Figure 4:
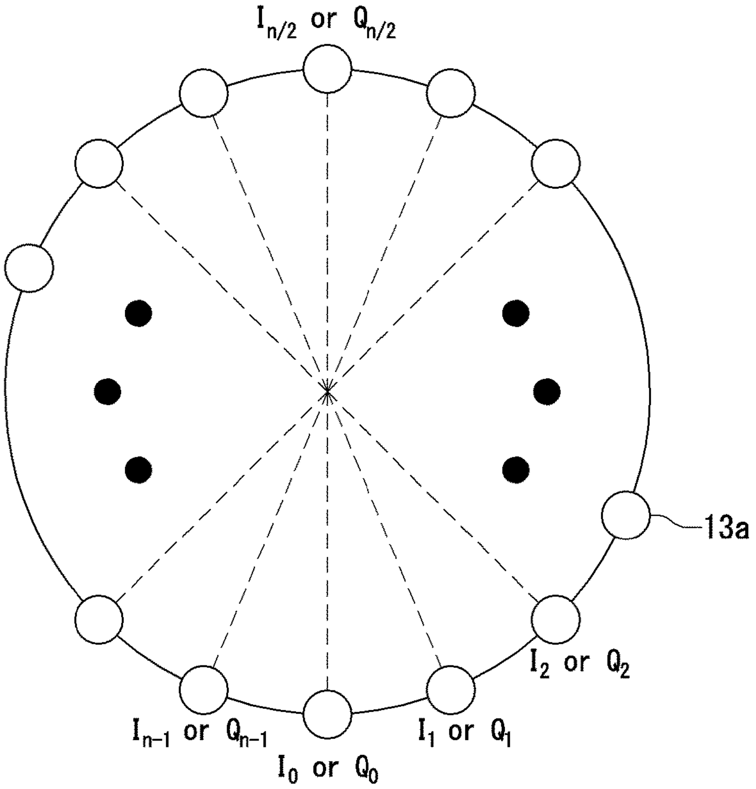
FIG. 4 is a diagram for describing the operating principle of multi-feed ports of a radiating element having an axially symmetric structure on the basis of the reconfigurable feed circuit of FIG. 3.

FIG. 3 is a block diagram of a configuration which may be applied to the reconfigurable feed circuit in the antenna element of FIG. 2. FIG. 4 is a diagram for describing the operating principle of multi-feed ports of a radiating element having an axially symmetric structure on the basis of the reconfigurable feed circuit of FIG. 3.

Referring to FIG. 3, the reconfigurable feed circuit 18 selects and arranges RF inputs input from the feed circuit network on the basis of polarization control data (PCD) and angular phase control data (APCD) and thereby sequentially or selectively feeds a plurality of feed ports connected to a single RE, that is, one pair of feed ports which are orthogonal to each other among multi-feed ports (hereinafter "dual orthogonal feed ports").

Also, as shown in FIG. 3, the reconfigurable feed circuit 18 includes a polarization selection switch 182, a channel generation circuit 183, a channel branch circuit 184, a switch arrangement circuit 185, and a channel combining circuit 186 to achieve an electrical phase change through an angular rotation feed method of dual orthogonal feed ports selected from among multi-feed ports ($I_0$, $Q_0$) to ($I_{n-1}$, $Q_{n-1}$) connected to a radiating element having an axially symmetric structure.

The polarization selection switch 182 may have a single pole double throw (SPDT) switch structure having a 50Ω terminating resistance therein. In the example embodiment, the polarization selection switch 182 may be optionally used. In other words, the polarization selection switch 182 may be used for implementing a radiating element having right hand circular polarization (RHCP) or left hand circular polarization (LHCP) by reconfigurable switching and may be omitted without being used to generate one circular polarization. Also, in some modified examples, even when a polarization switch is not used, RHCP or LHCP may be selected by a polarization selection algorithm of dual feed ports, for example, an algorithm for an LHCP operation or an RHCP operation.

The channel generation circuit 183 is an I&Q generation circuit which generates an I channel and a Q channel. Basically, the channel generation circuit 183 may have four terminals, and in this case, the channel generation circuit 183 may include one input port, two output ports, and one isolation terminal. The two output ports provide a relative phase difference of 90° with respect to the same amplitude and thus have the relationship of an I channel and a Q channel. When the input ports are changed, characteristics of output signals are changed with each other, and thus the relationship of the I channel and the Q channel may also be reversed according to input ports.

The channel generation circuit 183 may be implemented using a 90° hybrid coupler (HC) circuit. In this case, the channel generation circuit 183 may include, for example, four transmission lines having a length of 0.25 times a wavelength (0.25λ) for forming an outer closed loop, four transmission lines having a length of 0.25λ for forming an inner closed loop, and a control circuit element for reconfiguring a characteristic impedance by connecting or disconnecting the outer closed loop and the inner closed loop. Here, λ denotes a wavelength of an operating frequency or a center frequency of an operating frequency band.

The channel branch circuit 184 is an I&Q channel branch circuit which causes the I channel to branch into a plurality of channels and causes the Q channel to branch into a plurality of channels. The channel branch circuit 184 divides each of one I channel signal and one Q channel signal input from the channel generation circuit 183 into n channel signals. The channel branch circuit 184 has two inputs and 2n outputs.

The switch arrangement circuit 185 provides a function of selecting a path for angular phase control and includes a total of 2n switch circuits, that is, n switch circuits each for the resultant I channels and the resultant Q channels. Here, as the on switch of each switch circuit, only one switch is selected from among the plurality of I channels and among the plurality of Q channels, and other switches are opened or closed. In an example embodiment, each of the channel branch circuit 184 and the switch arrangement circuit 185 may be implemented as two single pole n throw (SPnT) switch circuits.

The channel combining circuit 186 is an I&Q channel combining circuit which combines the selected I channel and Q channel and has a function of combining n I channel signal paths and n Q channel signal paths. Since the channel combining circuit 186 operates to combine only one of the n I channel signal paths and only one of the n Q channel signal paths at a specific operation timing, there are 2n inputs and n outputs. According to an example embodiment, the output of the channel combining circuit 186 may be selectively connected to $I_j$ and $Q_j$ (j=0, 1, . . . , and n−1) corresponding to a polarization RF signal.

n output ports of the channel combining circuit 186 may be connected to a radiating element 11 (see FIG. 2A) through multi-feed ports, and the $I_j$ channel or the $Q_j$ channel may be selectively used at each of the output ports.

According to the above-described reconfigurable feed circuit 18, a radiating element including the multi-feed ports 13*a* as shown in FIG. 4 may selectively operate by a feed signal for two orthogonal feed ports having a phase difference of 90° at a corresponding operating frequency to generate circular polarization. The dual orthogonal feed ports connected to the radiating element may be connected directly or by electromagnetic coupling. I channel and Q channel connection points shown as such dual orthogonal feed ports denote that there is a phase difference of 90° therebetween.

Also, as shown in FIG. 4, fed connection points are not simultaneously connected to a pair of $I_j$ and $Q_j$ (j=0 to n−1, and n is an even number such as 4, 6, 8, or 10), and only one of $I_j$ and $Q_j$ is selectively connected. Further, to generate circular polarization, two independent feed ports are independently selected from the I channel and the Q channel to have a rotation angle difference of 90° in the radial direction.

Also, as shown in FIG. 4, the multi-feed ports connected to the radiating element and having an axially symmetric structure may be disposed at regular intervals of 360°/n (n is the number of multi-feed ports connected to the radiating element) in the azimuthal direction. When the radiating element is activated for signal emission, the operating state of n−2 feed ports which are not connected to the radiating element may be controlled so that a condition for opening is satisfied in an operating frequency band.

Figure 5:
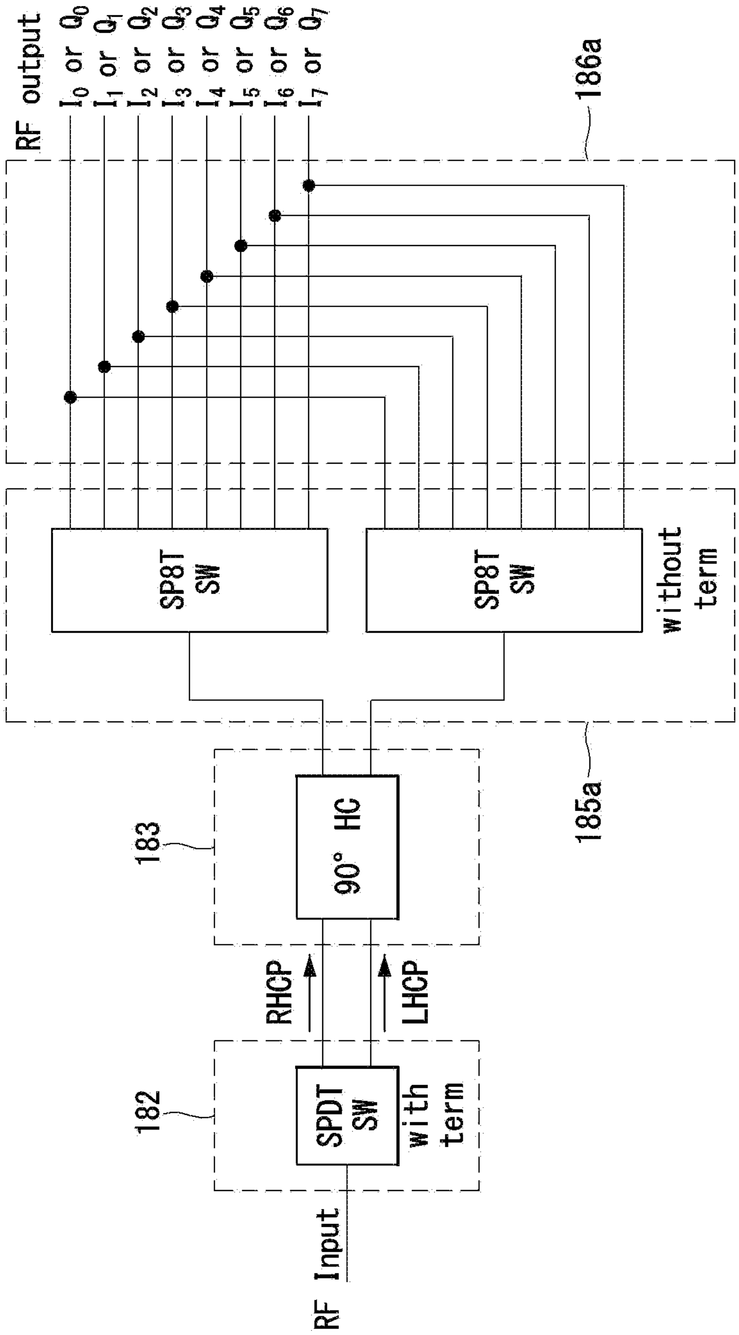
FIG. 5 is a detailed partial block diagram of a 3-bit reconfigurable feed circuit which may be employed in the antenna element of FIG. 2B.
Figure 6:
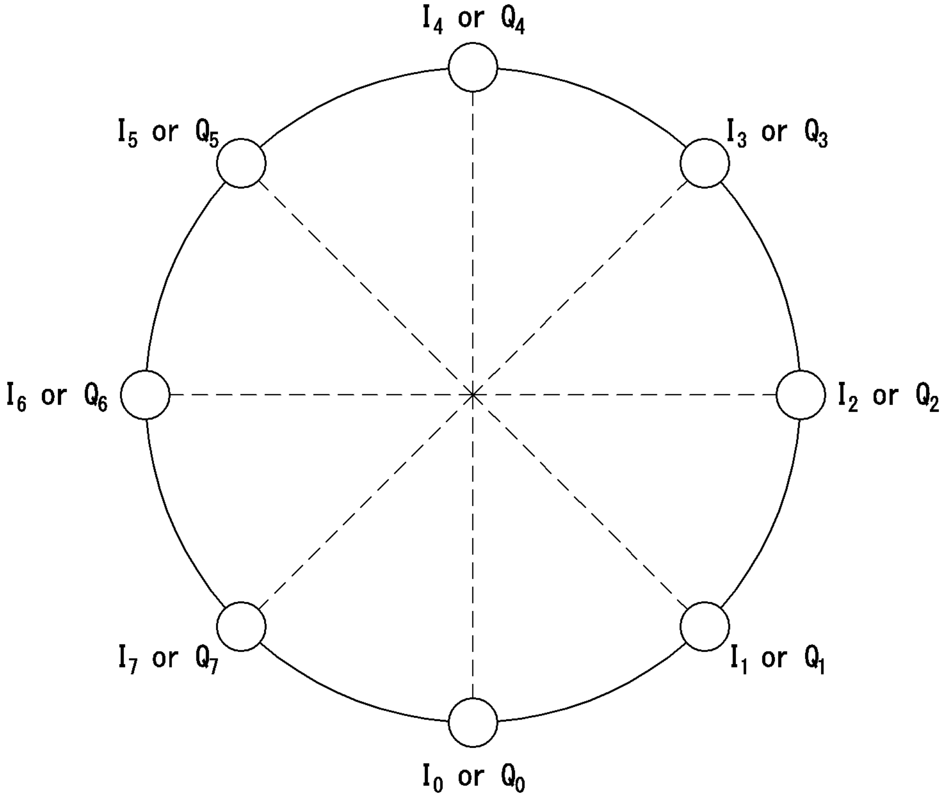
FIG. 6 is a schematic diagram for describing the arrangement of multi-feed ports corresponding to the 3-bit feed ports of FIG. 5.

FIG. 5 is a detailed partial block diagram of a 3-bit reconfigurable feed circuit which may be employed in the antenna element of FIG. 2B. FIG. 6 is a schematic diagram for describing the arrangement of multi-feed ports corresponding to the 3-bit feed ports of FIG. 5.

Referring to FIG. 5, the reconfigurable feed circuit includes a polarization selection switch 182, a channel generation circuit 183, a channel branch and switch circuit 185*a*, and a 3-bit channel combining circuit 186*a*.

The polarization selection switch 182 which may be optionally used may have an SPDT structure including a 50Ω terminating resistance term for impedance matching therein. The channel generation circuit 183 may include a 90° HC to have substantially the same configuration as the channel generation circuit of FIG. 3.

The channel branch and switch circuit 185*a* may be used by implementing the channel branch circuit 184 (see FIG. 3) and the switch arrangement circuit 185 (see FIG. 3) with two sing-pole eight-throw (SP8T) switch circuits SP8T SW which are high-frequency switch integrated circuits (ICs). In this case, the channel branch and switch circuit 185*a* may not include the terminating resistance term.

The channel combining circuit 186*a* has eight outputs obtained by combining RF signals output from the two SP8T switch circuits into $I_j$ and $Q_j$ (j=0, 1, 2, . . . , and 7). Eight output ports of the channel combining circuit 186*a* are separately connected to corresponding feed ports of a radiating element having eight feed ports.

When the reconfigurable feed circuit operates, the six feed ports other than the two selected orthogonal feed ports are opened in an operating frequency band. To satisfy such a requirement, according to an example embodiment, a feed transmission line from the opened switching terminal in the channel branch and switch circuit 185*a* to a corresponding feed port of the radiating element is designed to be n (n is an integer) times 0.5 times a wavelength ($0.5\lambda_g$ where $\lambda_g$ denotes a guided wavelength) of a mean operating frequency. According to another example embodiment, a feed transmission line from the closed switching terminal in the channel branch and switch circuit 185*a* to a corresponding feed port of the radiating element may be designed to be n times 0.25 times a wavelength ($0.25\lambda_g$ where $\lambda_g$ denotes a guided wavelength) of a mean operating frequency.

According to the example embodiment, to implement a three-bit (eight states) angular phase shift function according to a three-bit angular phase generated by the reconfigurable feed circuit of FIG. 5, eight ($2^3$) feed ports shown in FIG. 6 may be disposed at a certain distance from the center thereof in radial directions or disposed at regular intervals in the azimuthal direction and electrically and selectively connected to the radiating element.

Figure 7A:
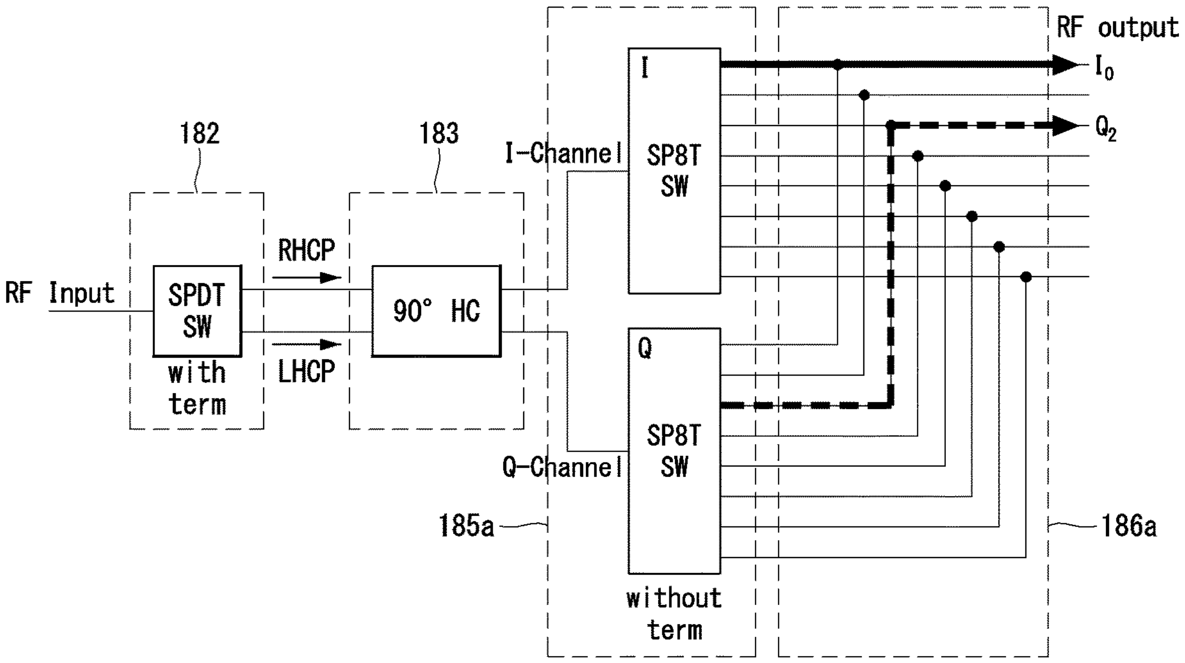
FIGS. 7A to 7C are diagrams illustrating 3-bit angular phase shift operations of RHCP performed by the reconfigurable feed circuit of FIG. 5.
Figure 7A:
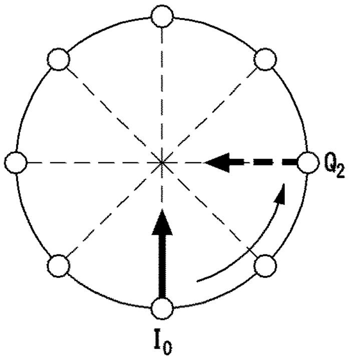
Figure 7B:
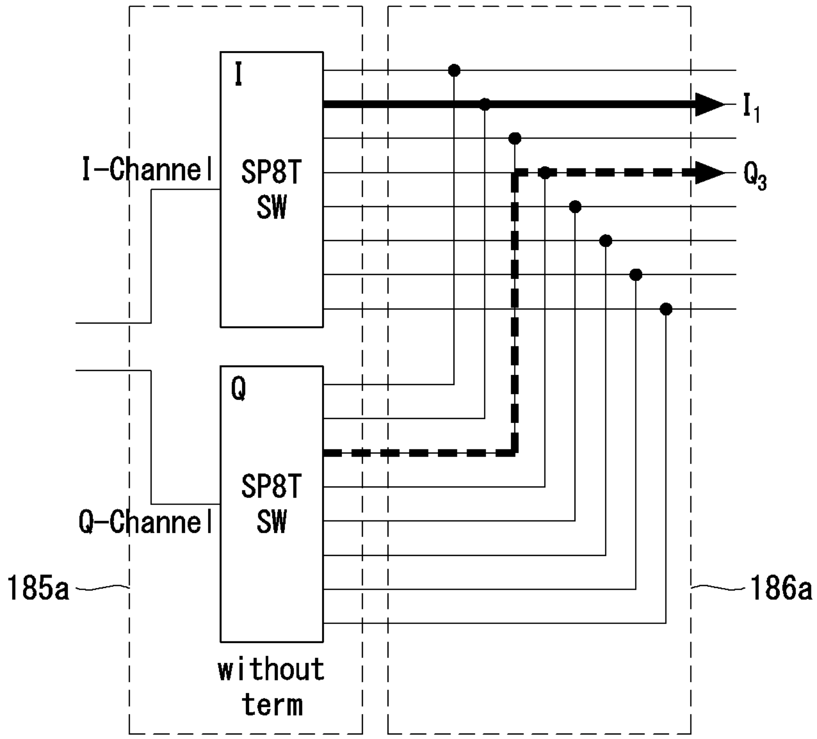
Figure 7B:
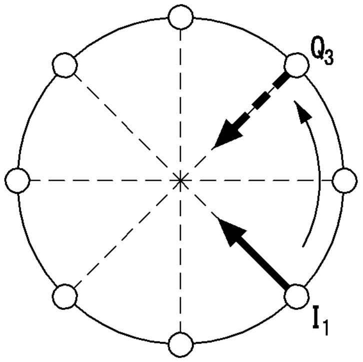
Figure 7C:
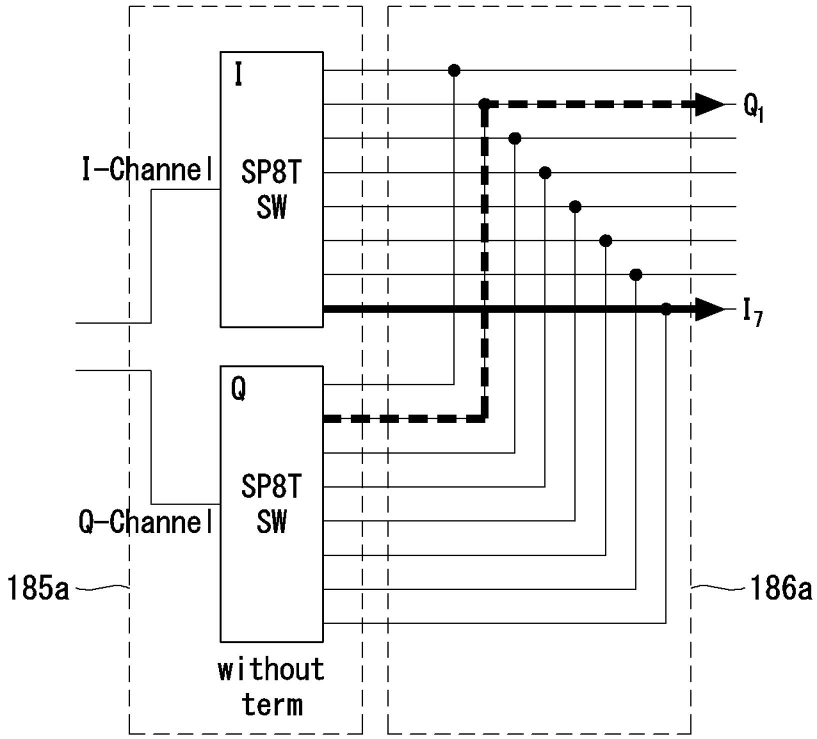
Figure 7C:
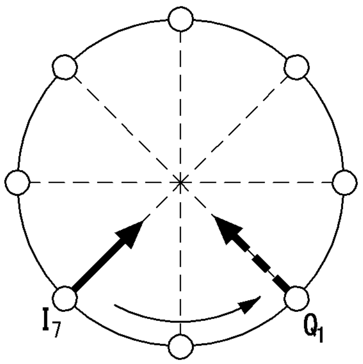

FIGS. 7A to 7C are diagrams illustrating 3-bit angular phase shift operations of RHCP performed by the reconfigurable feed circuit of FIG. 5.

Referring to (a1) of FIG. 7A, to obtain a reference phase (0°) through the reconfigurable feed circuit, the polarization selection switch 182 of the reconfigurable feed circuit is required to form right-hand circular polarization from an RF input. To this end, first, the polarization selection switch 182 is set or controlled so that a right-hand circular polarization terminal is selected at the SPDT switch. Also, the reconfigurable feed circuit generates an I channel signal and a Q channel signal using the 90° HC circuit of the channel generation circuit 183. Then, the reconfigurable feed circuit selects the $I_0$ channel and the $Q_2$ channel from among I channels and Q channels, which are input from the channel generation circuit 183 and have the same amplitude and a phase difference of 90°, through separate control of the two SP8T switches of the channel selection and switch circuit 185*a*.

As shown in (a2) of FIG. 7A, the selected $I_0$ channel and $Q_2$ channel are connected to one predetermined pair of feed ports in the radiating element and operate as a reference phase of a right-hand circularly polarized signal. The other six I and Q channels which are not selected are opened in the operating frequency band.

Next, referring to (b1) of FIG. 7B, to achieve a +45° (or −315°) phase shift through the reconfigurable feed circuit, the polarization selection switch 182 of the reconfigurable feed circuit is required to form right-hand circular polarization from an RF input. To this end, first, the right-hand circular polarization terminal is selected at the SPDT switch. Also, the reconfigurable feed circuit generates an I channel signal and a Q channel signal using the 90° HC circuit of the channel generation circuit 183. Then, the reconfigurable feed circuit selects the $I_1$ channel and the $Q_3$ channel from among I channels and Q channels, which are input from the channel generation circuit 183 and have the same amplitude and a phase difference of 90°, through separate control of the two SP8T switches of the channel selection and switch circuit 185*a*.

As shown in (b2) of FIG. 7B, the selected $I_1$ channel and $Q_3$ channel are connected to predetermined dual orthogonal feed ports in the radiating element and operate in a +45° (or −315°) phase shift state of a right-hand circularly polarized signal. The other six I and Q channels which are not selected are opened in the operating frequency band.

Likewise, referring to (c1) of FIG. 7C, to achieve a −45° (or +315°) phase shift through the reconfigurable feed circuit, the polarization selection switch 182 of the reconfigurable feed circuit is required to form right-hand circular polarization from an RF input. To this end, first, the right-hand circular polarization terminal is selected at the SPDT switch. Also, the reconfigurable feed circuit generates an I channel signal and a Q channel signal using the 90° HC circuit of the channel generation circuit 183. Then, the reconfigurable feed circuit selects the $I_7$ channel and the $Q_1$ channel from among I channels and Q channels, which are input from the channel generation circuit 183 and have the same amplitude and a phase difference of 90°, through separate control of the two SP8T switches of the channel selection and switch circuit 185*a*.

As shown in (c2) of FIG. 7C, the selected 17 channel and $Q_1$ channel are connected to one predetermined pair of feed ports in the radiating element and operate in a −45° (or +315°) phase shift state of a right-hand circularly polarized signal. The other six I and Q channels which are not selected are opened in the operating frequency band.

The above-described 3-bit angular phase shift operation states ($S_j$, j=0, 1, 2, . . . , and 7) having right-hand circular polarization may be obtained through the above-described method as shown in Table 1.

TABLE 1

| State | I, Q channel | Angular phase shift | Notes |
|---|---|---|---|
| $S_0$ | $I_0$, $Q_2$ | +0° | Reference phase |
| $S_1$ | $I_1$, $Q_3$ | +45°/−315° | 3-bit phase change |
| $S_2$ | $I_2$, $Q_4$ | +90°/−270° | |
| $S_3$ | $I_3$, $Q_5$ | +135°/−225° | |
| $S_4$ | $I_4$, $Q_6$ | +180°/−180° | |
| $S_5$ | $I_5$, $Q_7$ | +225°/−135° | |
| $S_6$ | $I_6$, $Q_0$ | +270°/−90° | |
| $S_7$ | $I_7$, $Q_1$ | +315°/−45° | |

Figure 8A:
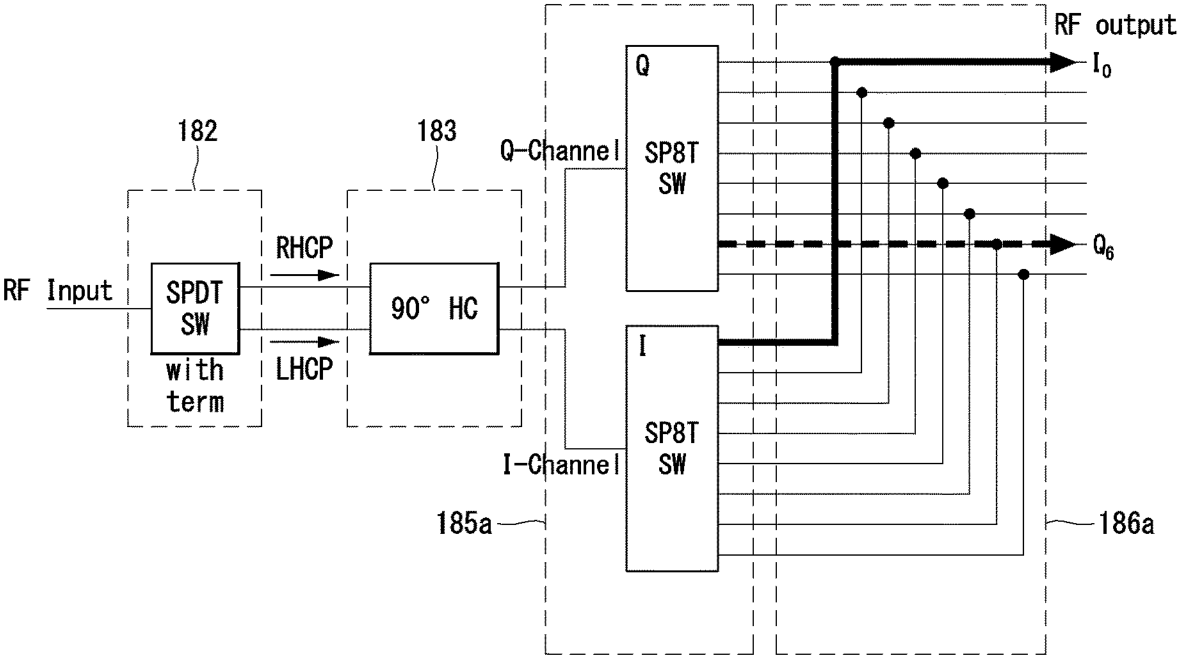
FIGS. 8A to 8C are diagrams illustrating 3-bit angular phase shift operations of LHCP performed by the reconfigurable feed circuit of FIG. 5.
Figure 8A:
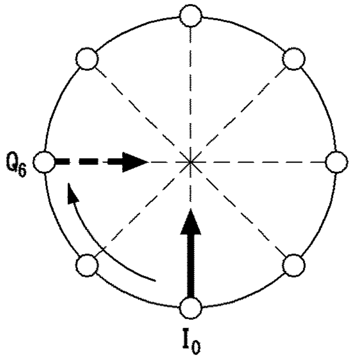
Figure 8B:
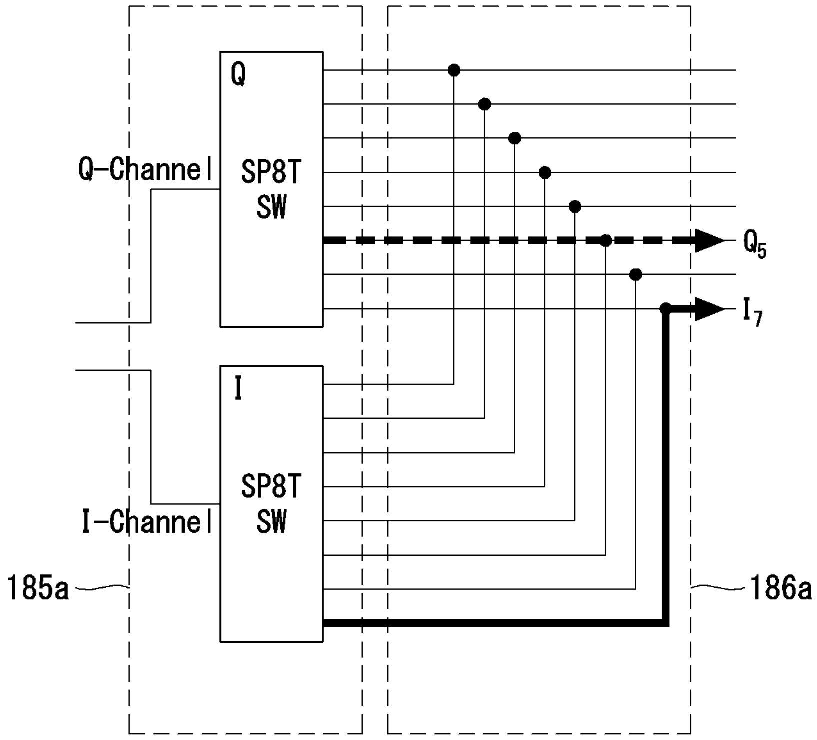
Figure 8B:
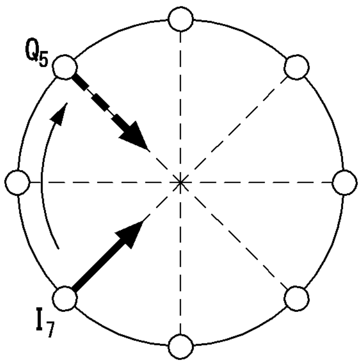
Figure 8C:
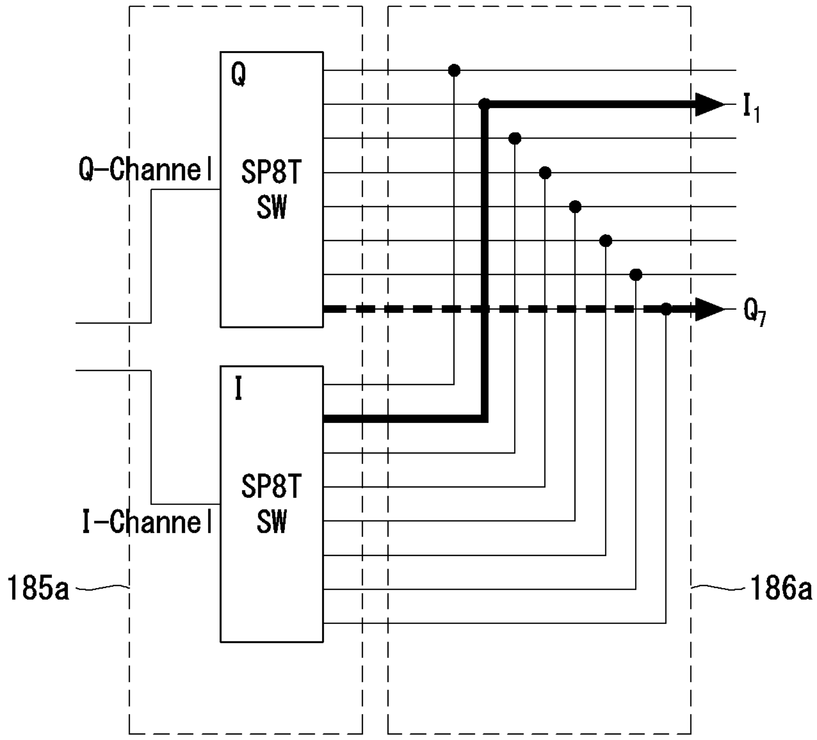
Figure 8C:
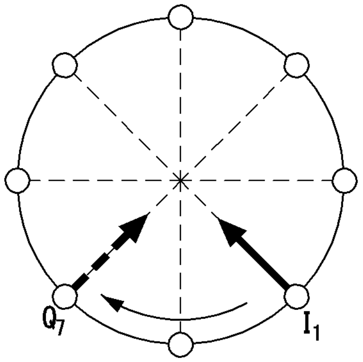

FIGS. 8A to 8C are diagrams illustrating 3-bit angular phase shift operations of LHCP performed by the reconfigurable feed circuit of FIG. 5.

Referring to (a1) of FIG. 8A, to obtain a reference phase (0°) through the reconfigurable feed circuit, the polarization selection switch 182 of the reconfigurable feed circuit is required to form left-hand circular polarization from an RF input. To this end, first, a left-hand circular polarization terminal is selected at the SPDT switch. Also, the reconfigurable feed circuit generates an I channel signal and a Q channel signal using the 90° HC circuit of the channel generation circuit 183. Then, the reconfigurable feed circuit selects the $I_0$ channel and the $Q_6$ channel from among I channels and Q channels, which are input from the channel generation circuit 183 and have the same amplitude and a phase difference of 90°, through separate control of the two SP8T switches of the channel selection and switch circuit 185*a*.

As shown in (a2) of FIG. 8A, the selected $I_0$ channel and $Q_6$ channel are connected to one predetermined pair of feed ports in the radiating element and operate as a reference phase of a right-hand circularly polarized signal. The other six I and Q channels which are not selected are opened in the operating frequency band.

Next, referring to (b1) of FIG. 8B, to achieve a +45° (or −315°) phase shift through the reconfigurable feed circuit, the polarization selection switch 182 of the reconfigurable feed circuit is required to form left-hand circular polarization from an RF input. To this end, first, the left-hand circular polarization terminal is selected at the SPDT switch. Also, the reconfigurable feed circuit generates an I channel signal and a Q channel signal using the 90° HC circuit of the channel generation circuit 183. Then, the reconfigurable feed circuit selects the $I_7$ channel and the $Q_5$ channel from among I channels and Q channels, which are input from the channel generation circuit 183 and have the same amplitude and a phase difference of 90°, through separate control of the two SP8T switches of the channel selection and switch circuit 185*a*.

As shown in (b2) of FIG. 8B, the selected 17 channel and $Q_5$ channel are connected to a predetermined pair of feed ports in the radiating element and operate in a +45° (or −315°) phase shift state of a left-hand circularly polarized signal. The other six I and Q channels which are not selected are opened in the operating frequency band.

Likewise, referring to (c1) of FIG. 8C, to achieve a −45° (or +315°) phase shift through the reconfigurable feed circuit, the polarization selection switch 182 of the reconfigurable feed circuit is required to form left-hand circular polarization from an RF input. To this end, first, the left-hand circular polarization terminal is selected at the SPDT switch. Also, the reconfigurable feed circuit generates an I channel signal and a Q channel signal using the 90° HC circuit of the channel generation circuit 183. Then, the reconfigurable feed circuit selects the $I_1$ channel and the $Q_7$ channel from among I channels and Q channels, which are input from the channel generation circuit 183 and have the same amplitude and a phase difference of 90°, through separate control of the two SP8T switches of the channel selection and switch circuit 185*a*.

As shown in (c2) of FIG. 8C, the selected $I_1$ channel and $Q_7$ channel are connected to one predetermined pair of feed ports in the radiating element and operate in a −45° (or +315°) phase shift state of a left-hand circularly polarized signal. The other six I and Q channels which are not selected are opened in the operating frequency band.

The above-described 3-bit angular phase shift operation states ($S_j$, j=0, 1, 2, . . . , and 7) having left-hand circular polarization may be obtained through the above-described method as shown in Table 2.

TABLE 2

| State | I, Q channel | Angular phase shift | Notes |
|---|---|---|---|
| $S_0$ | $I_0$, $Q_6$ | +0° | Reference phase |
| $S_1$ | $I_7$, $Q_5$ | +45°/−315° | 3-bit phase change |
| $S_2$ | $I_6$, $Q_4$ | +90°/−270° | |
| $S_3$ | $I_5$, $Q_3$ | +135°/−225° | |
| $S_4$ | $I_4$, $Q_2$ | +180°/−180° | |
| $S_5$ | $I_3$, $Q_1$ | +225°/−135° | |
| $S_6$ | $I_2$, $Q_0$ | +270°/−90° | |
| $S_7$ | $I_1$, $Q_7$ | +315°/−45° | |

As seen from Table 1 or Table 2, a phase control method employing an angular rotation reconfigurable feed circuit according to the example embodiment has a stable electrical operating characteristic. In such highly reliable performance, only the amplitude characteristic of an angular phase state is the same as in an antenna element employing an existing digital phase shifter, and there is no cumulative phase error characteristic or frequency-phase dispersion characteristic, and thus a stable electrical characteristic is provided.

Figure 9:
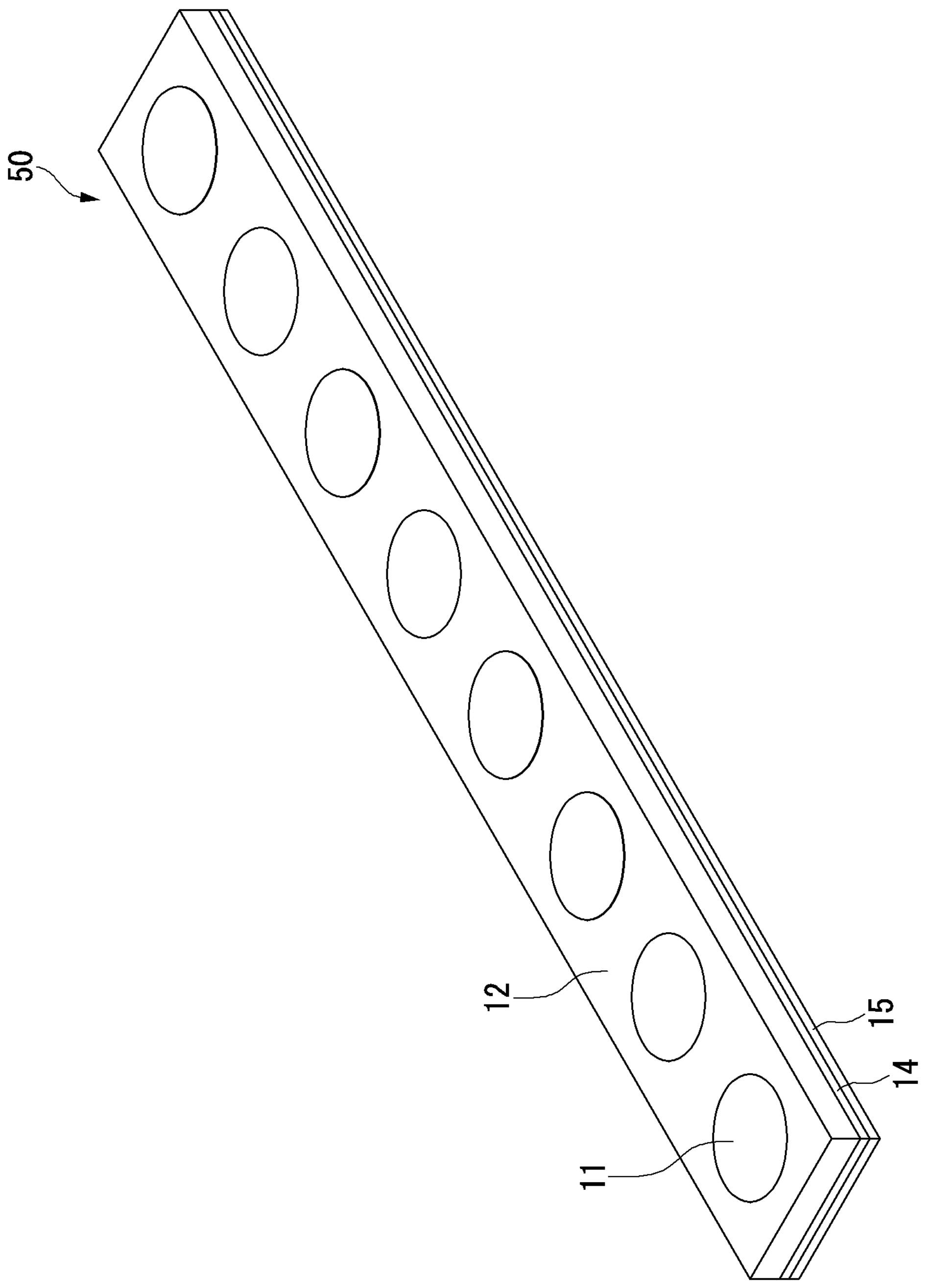
FIG. 9 is a perspective view of an array antenna according to another example embodiment of the present invention.
Figure 10:
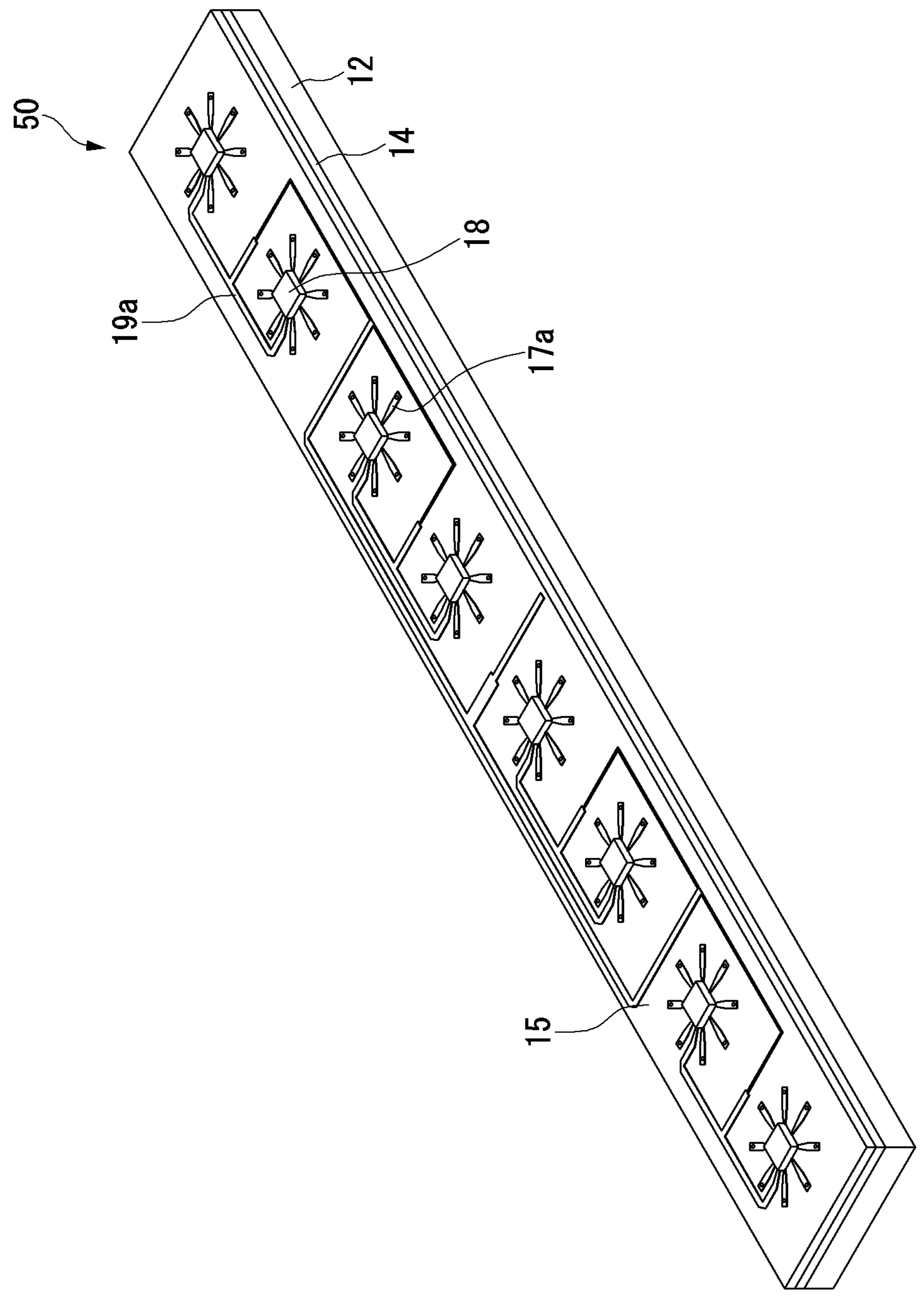
FIG. 10 is a perspective bottom view of the array antenna of FIG. 9.
Figure 11:
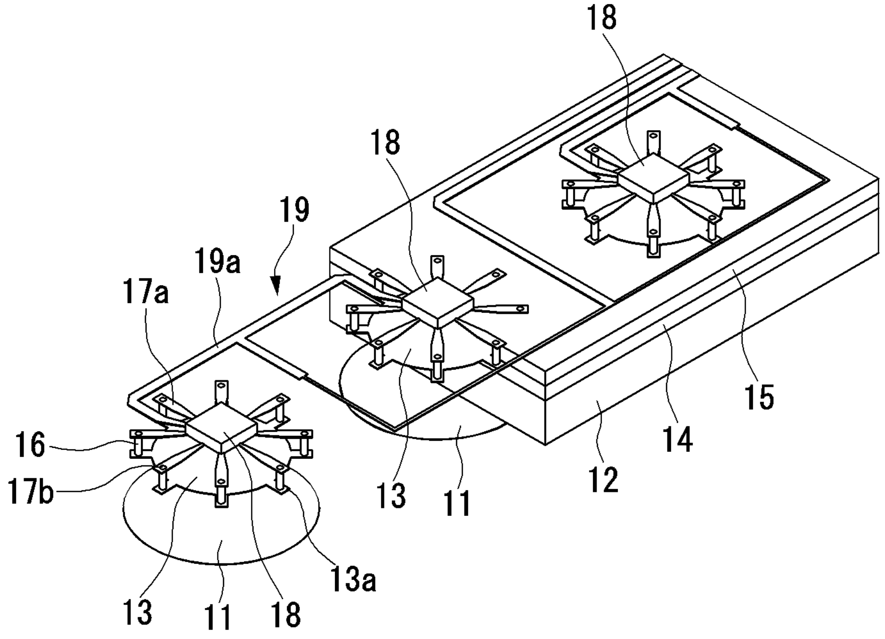
FIG. 11 is a partial exploded perspective view of the array antenna of FIG. 10.
Figure 12A:
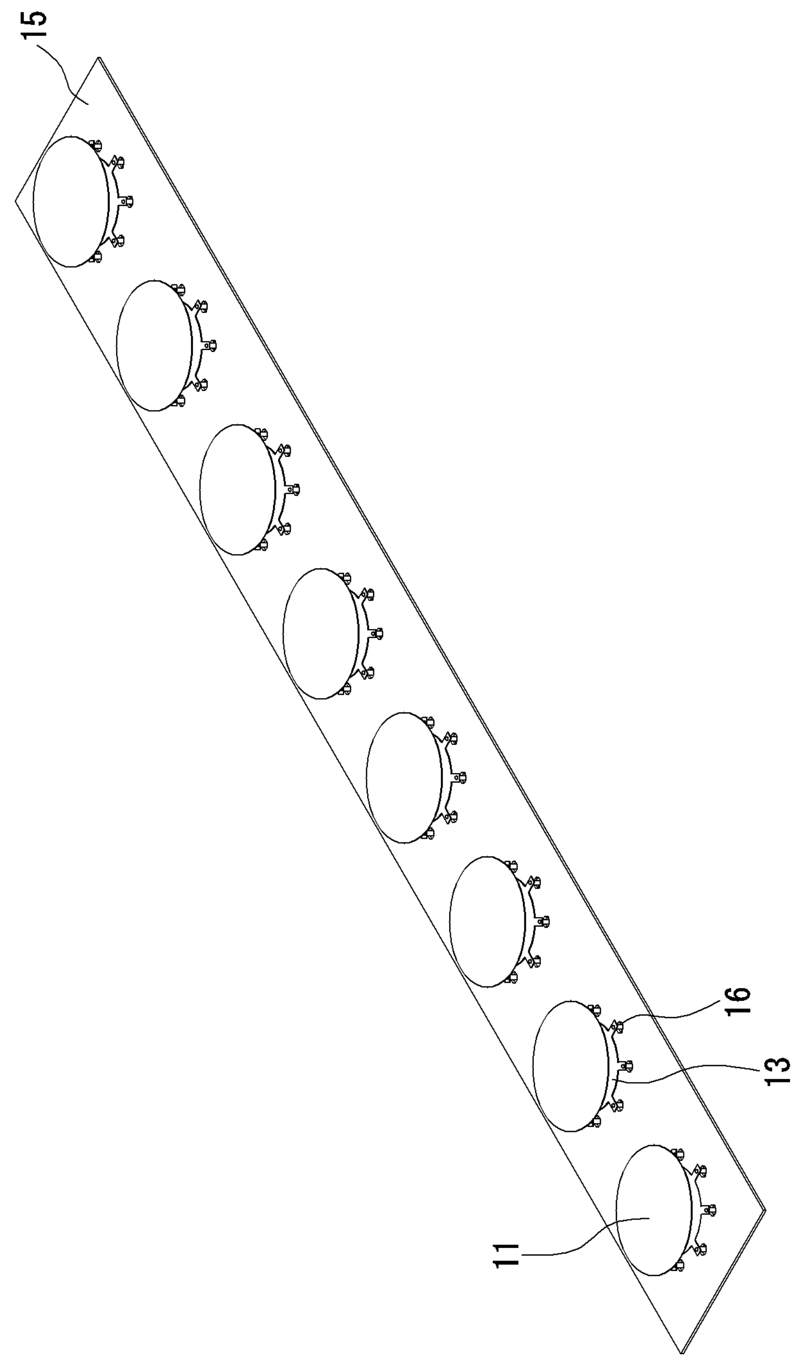
FIG. 12A is a perspective view illustrating a state in which a foam spacer and a circuit board are removed from the array antenna of FIG. 9.
Figure 12B:
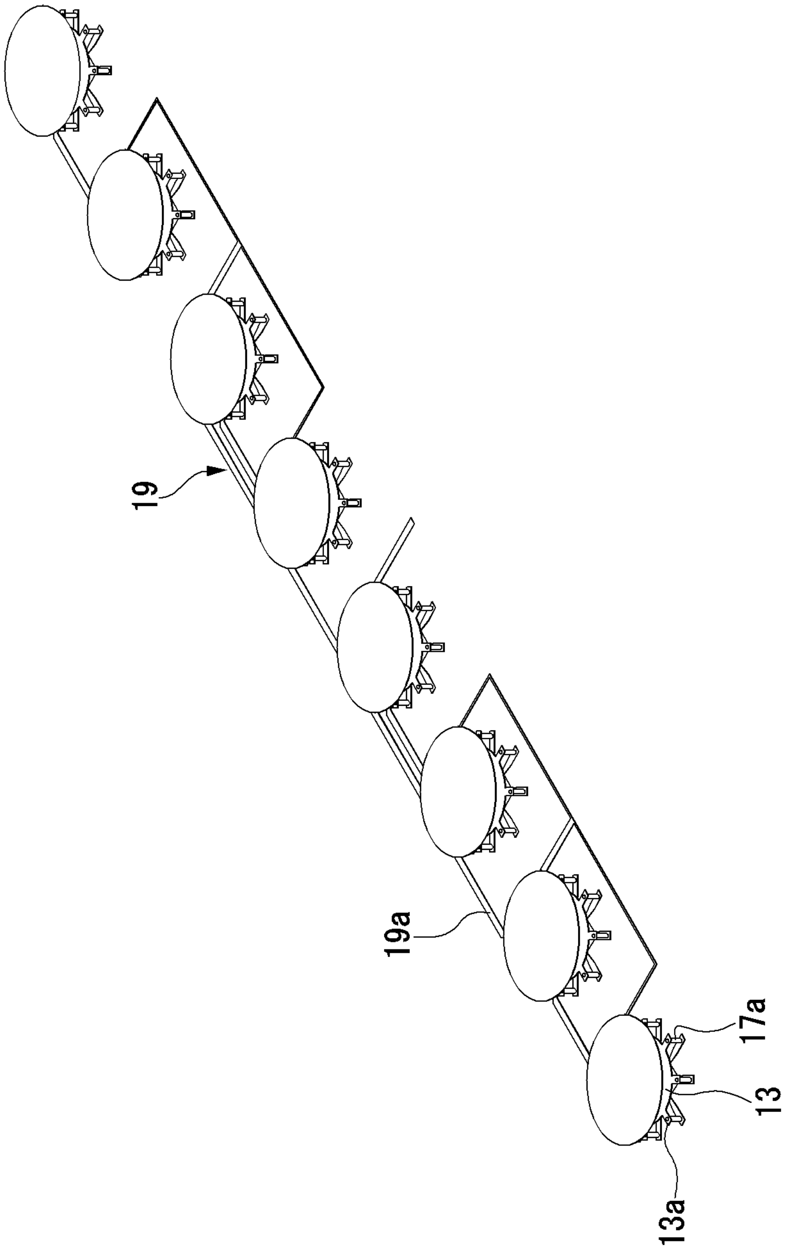
FIG. 12B is a perspective view illustrating a state in which a ground plane element is removed from the array antenna of FIG. 12A.
Figure 12C:
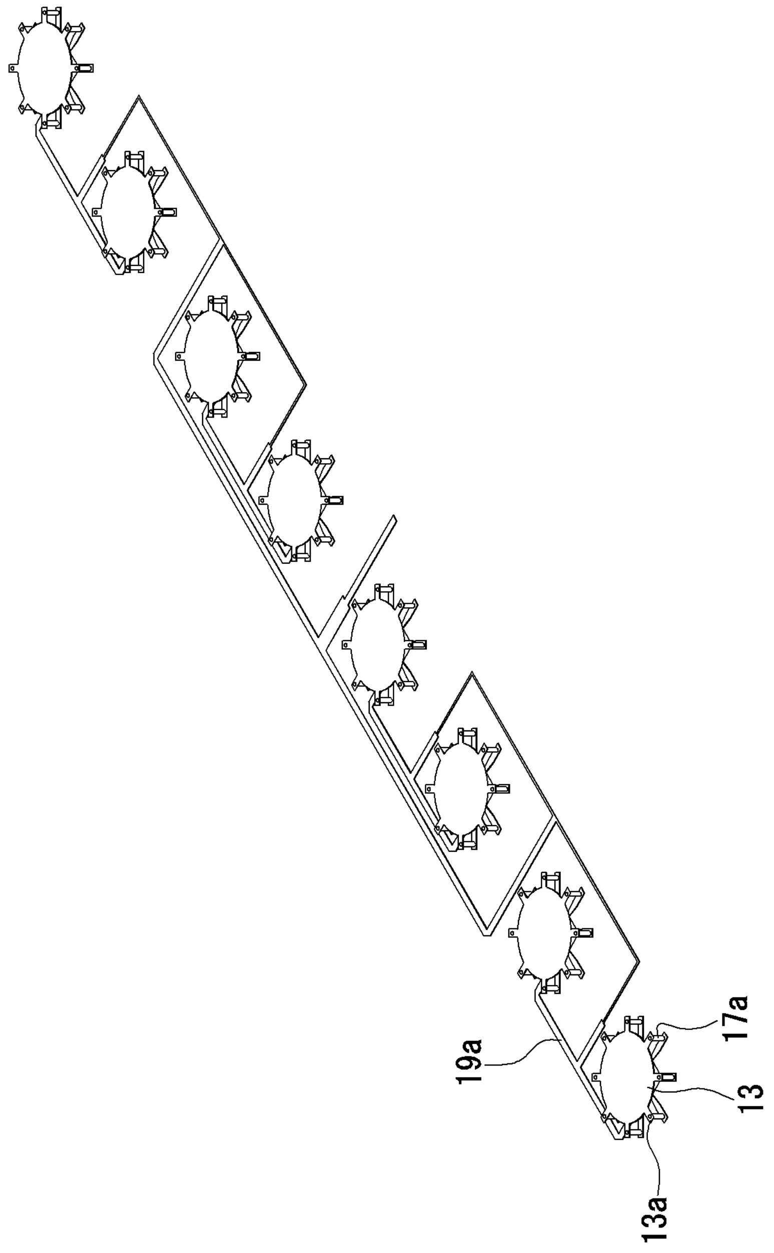
FIG. 12C is a perspective view illustrating a state in which a parasitic RE is removed from the array antenna of FIG. 12B.
Figure 13:
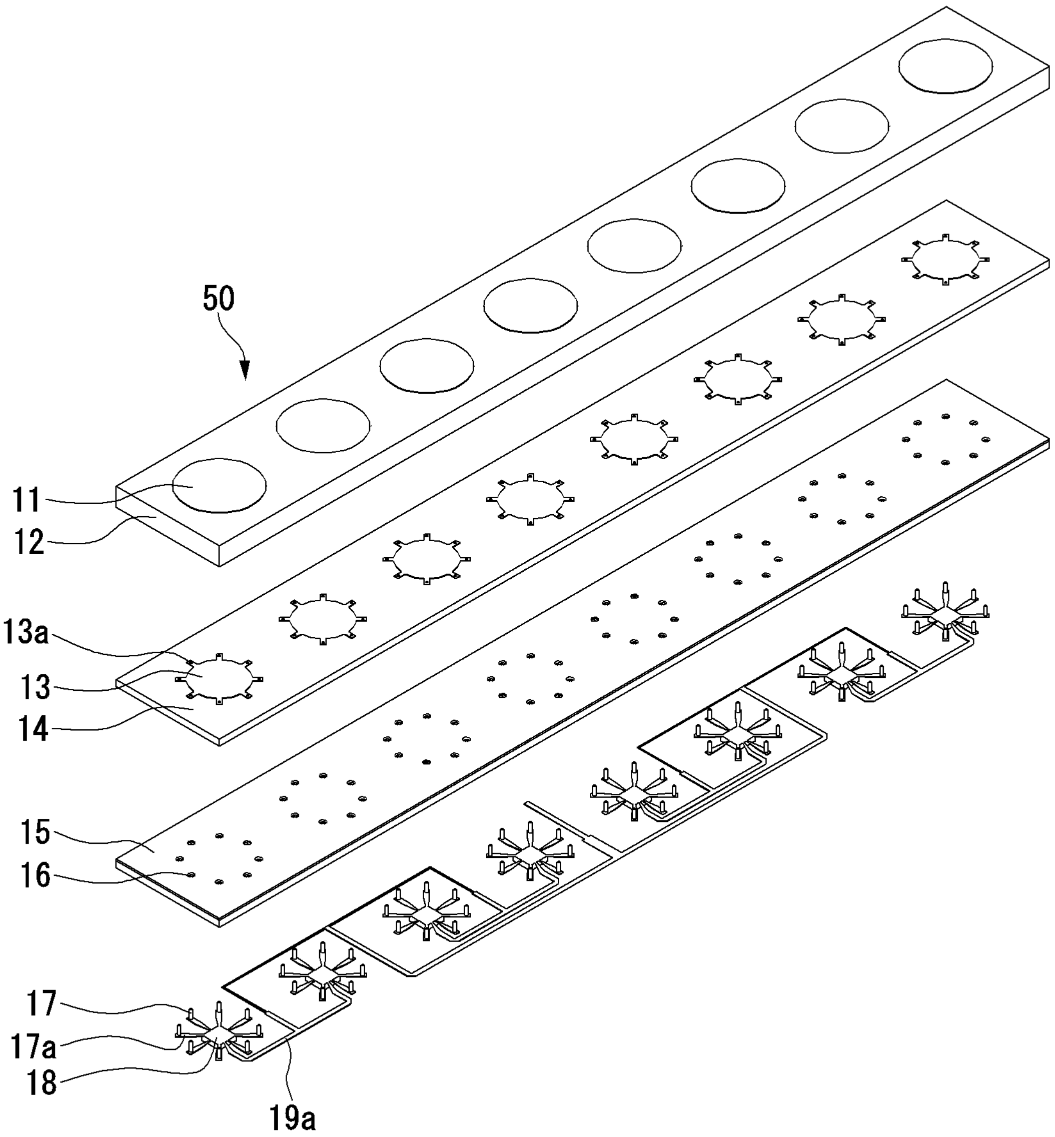
FIG. 13 is an exploded perspective view of the array antenna of FIG. 9.

FIG. 9 is a perspective view of an array antenna according to another example embodiment of the present invention. FIG. 10 is a perspective bottom view of the array antenna of FIG. 9. FIG. 11 is a partial exploded perspective view of the array antenna of FIG. 10. FIG. 12A is a perspective view illustrating a state in which a foam spacer and a circuit board are removed from the array antenna of FIG. 9. FIG. 12B is a perspective view illustrating a state in which a ground plane element is removed from the array antenna of FIG. 12A. FIG. 12C is a perspective view illustrating a state in which a parasitic RE is removed from the array antenna of FIG. 12B. FIG. 13 is an exploded perspective view of the array antenna of FIG. 9.

Referring to FIGS. 9 to 13, an array antenna 50 includes a radiation array in which a plurality of antenna elements 10 (see FIGS. 2A to 2E) are arranged and a feed circuit network including a plurality of reconfigurable feed circuits separately connected to the plurality of antenna elements.

The radiation array may include the plurality of antenna elements. The plurality of antenna elements provided in the radiation array may have a structure in which a feed line is omitted as compared to the antenna element of FIGS. 2A to 2E and include an operational RE 13 formed on one side of a circuit board 14 and multi-feed ports 13*a* attached to the operational RE 13.

Additionally, each antenna element of the radiation array may optionally include a parasitic RE 11 and a foam spacer 12 installed between the parasitic RE 11 and the operational RE 13.

Further, each antenna element of the radiation array may include a ground plane element 15 stacked on the other side of the circuit board 14, multi-feed via holes 16 formed in the ground plane element 15 to correspond to the multi-feed ports 13*a*, and multi-feed via pins 17 separately inserted into the multi-feed via holes 16.

The feed circuit network includes a plurality of reconfigurable feed circuits 18. Also, the feed circuit network includes a feed line 19*a* with one end connected to the plurality of reconfigurable feed circuits 18. The other end of the feed line 19*a* may be connected to a single input/output (I/O) terminal or a single I/O pad for RF inputs and RF outputs.

Figure 14:
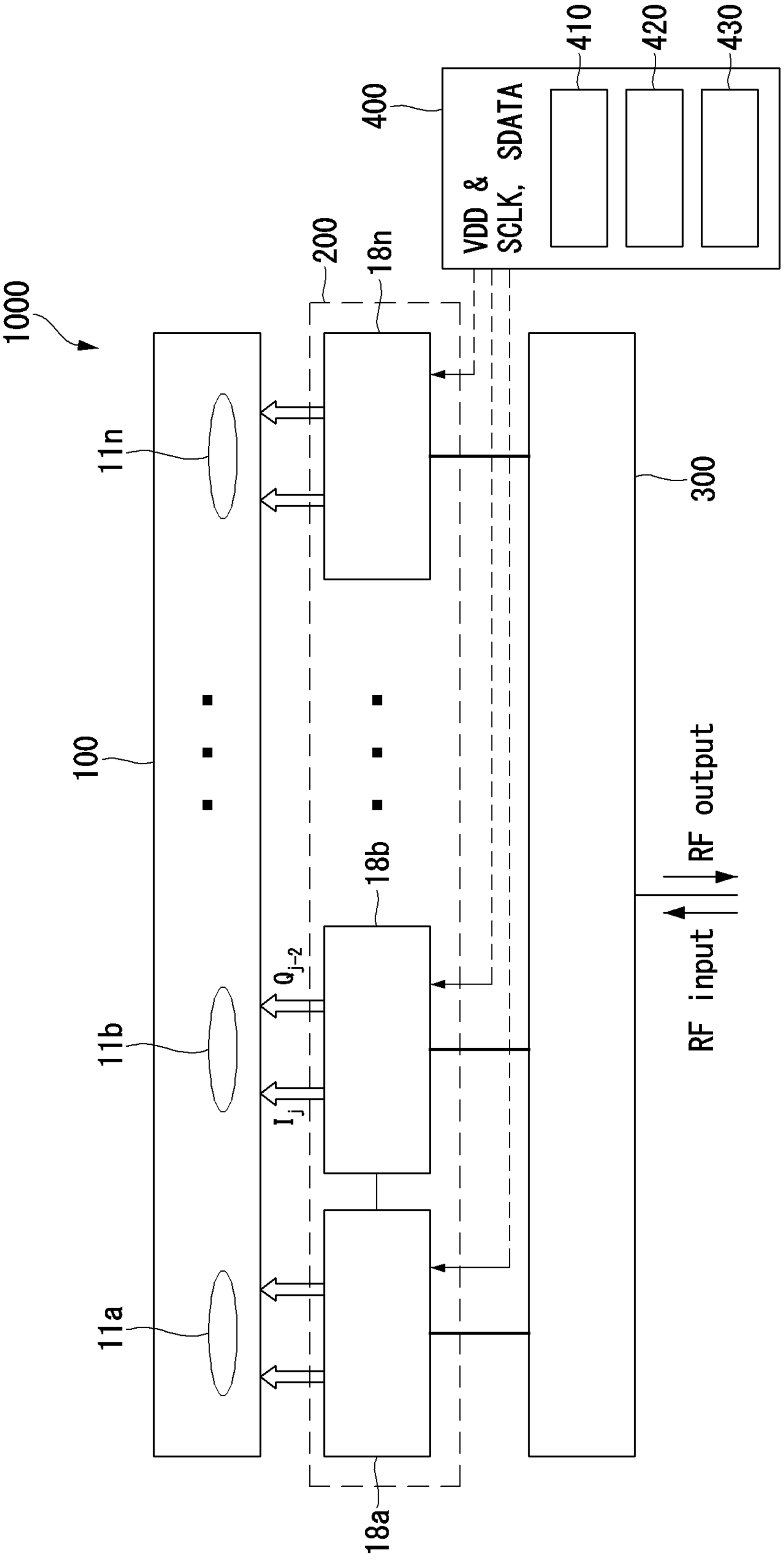
FIG. 14 is a schematic block diagram of a passive array antenna having a feed circuit network which may perform angular phase control as an array antenna according to another embodiment of the present invention.

Also, the array antenna 50 may further include an antenna control unit 400 (see FIG. 14). The antenna control unit may apply control signals for controlling the operation timings of the plurality of reconfigurable feed circuits 18 and data signals for controlling operation modes of the plurality of reconfigurable feed circuits 18 to the plurality of reconfigurable feed circuits 18.

In other words, through each of the plurality of reconfigurable feed circuits, the antenna control unit may control operations of the feed circuit network to change or reconfigure one pair of orthogonal feed ports among a plurality of feed ports in a radiating element of an antenna element, to electrically open the other feed ports among the plurality of feed ports from the radiating element, and to cause a relative phase shift through a changed or reconfigured dual orthogonal feed.

The above-described radiation array is not limited to a structure in which eight antenna elements are linearly disposed and may have a structure in which a plurality of circular polarization antenna elements having an M-bit ($2^M$ is the number of the plurality of feed ports) phase shifter function are arranged in a line or on a plane.

According to the example embodiment, it is possible to separately control the phase of a radiating element in each antenna element and perform an electron beam scanning function through uniform or non-uniform amplitude distribution or coupling of a plurality of radiating elements performed by a plurality of reconfigurable feed circuits in an array antenna.

Meanwhile, the array antenna 50 according to the example embodiment may be manufactured in the form of a combination of a radiation array and a feed circuit network as shown in FIG. 13. In this case, the radiation array includes a plurality of antenna elements, and each of the antenna elements includes the circuit board 14 in which a plurality of operational REs 13 each having multi-feed ports 13*a* are installed in a certain array, the foam spacer 12 which is disposed on one side of the circuit board 14 to support a plurality of parasitic REs 11 in a certain array, and the ground plane element 15 having the plurality of feed via holes 16 formed to correspond to the positions of the multi-feed ports 13*a* and disposed on the other side of the circuit board 14. The feed circuit network may include the reconfigurable feed circuits 18 arranged in a certain array, microstrip lines 17*a* extending in radial directions from each of the reconfigurable feed circuits 18, the plurality of feed via pins 17 separately installed at ends of the microstrip lines 17*a*, and the feed line 19*a* connected to each of the reconfigurable feed circuits 18.

The radiation array and the feed circuit network are parts constituting an array antenna. The radiation array and the feed circuit network may be separately prepared and integrated through a certain assembly method or coupling element to constitute an array antenna. After the radiation array and the feed circuit network are integrated, an antenna control unit may be connected to reconfigurable feed circuits, but the present invention is not limited thereto. The antenna control unit may be installed on the circuit board in advance and then connected to the reconfigurable feed circuits when the radiation array and the feed circuit network are integrated.

Figure 15A:
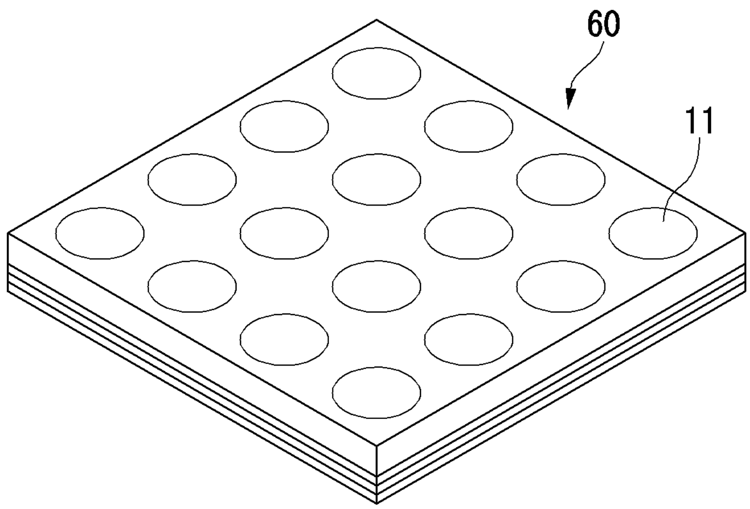
FIG. 15A is a schematic perspective view and FIG. 15B is a top view, illustrating an antenna shape applicable to the array antenna in FIG. 14.
Figure 15B:
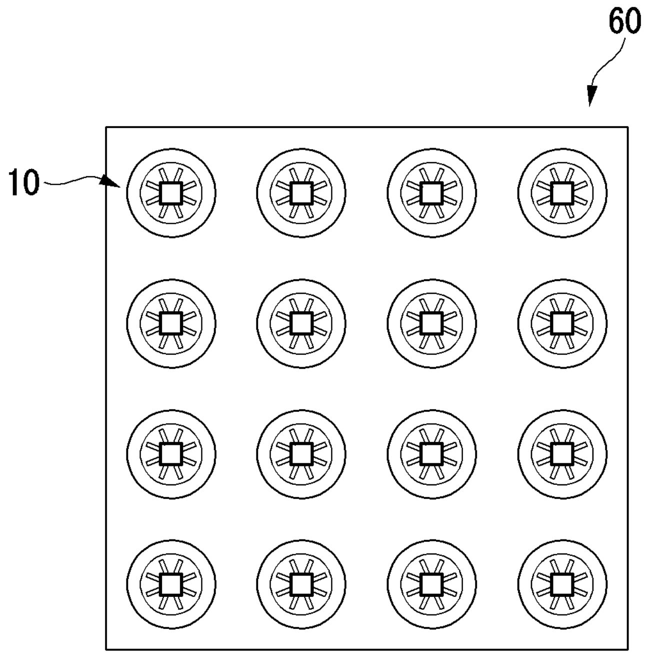
Figure 16A:
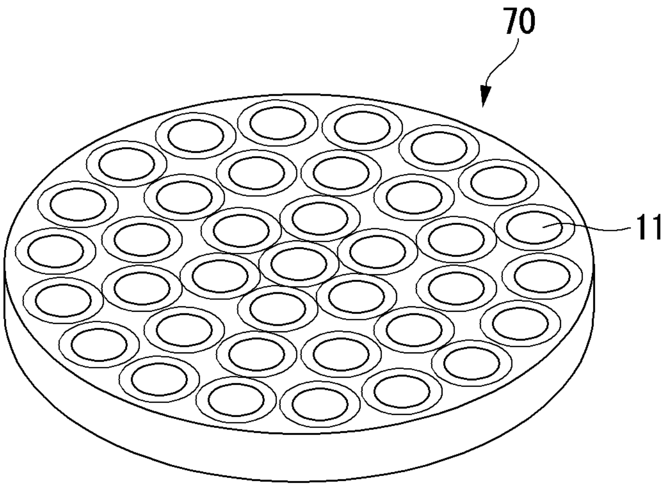
FIG. 16A is a schematic perspective view and FIG. 16B is a top view, illustrating another antenna shape applicable to the array antenna in FIG. 14.
Figure 16B:
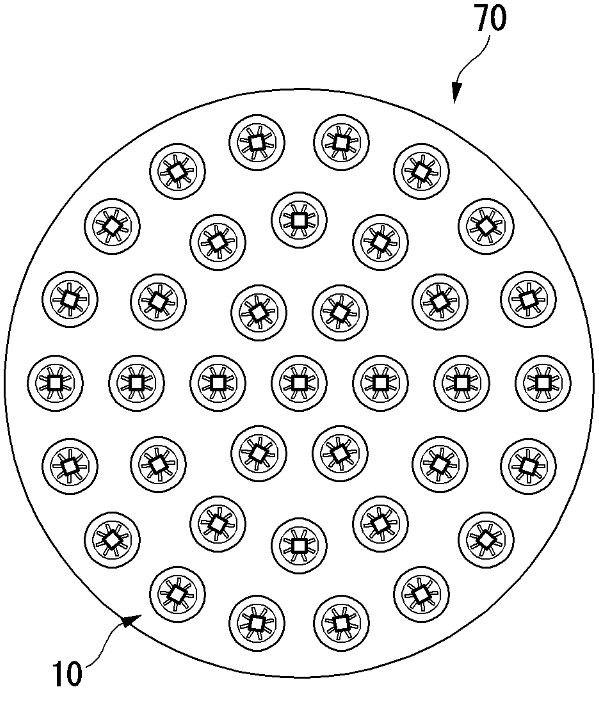

FIG. 14 is a schematic block diagram of a passive array antenna having a feed circuit network which may control an angular phase as an array antenna according to still another example embodiment of the present invention. FIG. 15A is a schematic perspective view and FIG. 15B is a top view, illustrating an antenna shape applicable to the array antenna in FIG. 14. FIG. 16A is a schematic perspective view and FIG. 16B is a top view, illustrating another antenna shape applicable to the array antenna in FIG. 14.

Referring to FIG. 14, an array antenna 1000 includes a radiation array 100 including a plurality of antenna elements 11*a*, 11*b*, . . . , and 11*n* and a feed circuit network 200 including a plurality of reconfigurable feed circuits 18*a*, 18*b*, . . . , and 18*n* separately connected to the plurality of antenna elements 11*a*, 11*b*, . . . , and 11*n*. Also, the array antenna 1000 may further include a feed network 300 including a feed line connected to each of the plurality of reconfigurable feed circuits 18*a*, 18*b*, . . . , and 18*n* and an antenna control unit 400 connected to the plurality of reconfigurable feed circuits 18*a*, 18*b*, . . . , and 18*n*.

The antenna control unit 400 controls an operation of each of the plurality of reconfigurable feed circuits 18*a*, 18*b*, . . . , and 18*n* by applying a source power VDD, a control signal SCLK, and a data signal SDATA to each of the plurality of reconfigurable feed circuits 18*a*, 18*b*, . . . , and 18*n*. The antenna control unit 400 basically includes an antenna control module 410. In a broad sense, however, the antenna control unit 400 may include the antenna control module 410 and a power supply 420 and optionally include a sensor unit 430. The power supply 420 may include power sources, such as a secondary battery and a capacitor, for supplying power to active devices in the reconfigurable feed circuits and a processor, other commercial power sources, and the like. The sensor unit 430 may be used for controlling various open loops of the antenna elements.

The radiation array 100 including the plurality of antenna elements each having an axially symmetric radiating element is connected to the feed circuit network 200 having the plurality of reconfigurable feed circuits 18*a*, 18*b*, . . . , and 18*n* for separate polarization reconfiguration and separate angular phase control of each of the radiating elements in the plurality of antenna elements arranged in one dimension or two dimensions.

Also, input or output ports of the reconfigurable feed circuits 18*a*, 18*b*, . . . , and 18*n* which control the angular phases of the radiating elements are connected to output or input ports of the simple low-loss feed network 300 such that power is combined or power is to distributed. The simple low-loss feed network 300 may provide a function for amplitude control of array antenna apertures, for example aperture tapering, to shape the radiation pattern of the array antenna such as side lobe level control.

The above-described array antenna 1000 operates to change or reconfigure one pair of orthogonal feed ports among a plurality of feed ports in a radiating element of an antenna element and to electrically open the other feed ports among the plurality of feed ports from the radiating element. In this case, a relative phase shift occurs at each radiating element due to changed or reconfigured dual orthogonal feed, that is, separate phase control of each radiating element. Accordingly, it is possible to perform an electron beam scanning function through uniform or non-uniform amplitude distribution or coupling of a plurality of radiating elements.

Also, the array antenna 1000 may supply the phase control data SDATA, the control clock SCLK, the source power VDD, etc. calculated on the basis of information acquired through a target tracking algorithm based on open and closed loop tracking to the feed circuit network 200 in which the reconfigurable feed circuits are arranged. This configuration can be run on the basis of high-speed switching, and thus it is possible to provide an electronic phased array antenna system which consumes little power, has a low external height, weighs little, and is inexpensive.

The passive electronic array antenna 1000 according to the example embodiment can be installed with a separate transmitting array antenna and receiving array antenna that operate separately and can also be installed such that the transmitting array antenna and the receiving array antenna operate simultaneously for both transmitting and receiving. In the case of both transmitting and receiving, a transmitting and receiving separation element, such as a circulator or an orthogonal mode transducer, can be additionally installed at the input port or the output port.

Also, according to the example embodiment, as shown in FIGS. 15A, 15B, 16A, and 16B, it is possible to easily implement passive array antennas 60 and 70 in a two-dimensional shape, such as quadrangular or circular shape, a planar shape, or a plate shape in which parasitic REs 11 or operational REs are exposed on the surface and a plurality of antenna elements 10 are arranged in any array in a plane.

According to the present invention described above, a phase shifter which is employed in the existing array antenna is not used, and one pair of orthogonal feed ports among a plurality of feed ports in each radiating element of an antenna element are changed or reconfigured to provide an electron beam generation function of an array antenna. Accordingly, compared to the existing transmitting or receiving array antenna, the volume, the weight, the power consumption, the manufacturing cost, etc. of an antenna can be remarkably reduced.

Also, according to the configuration of the present invention, it is possible to effectively develop a portable array antenna which is inexpensive, consumes little power, and can perform electron beam scanning, and the portable array antenna can replace expensive active array antennas in applications in the field of wireless communication, such as mobile communication and satellite communication.

What is claimed is:

1. An antenna element comprising:

a driving radiating element formed on one side of a circuit board and having multi-feed ports;

a ground plane element formed on another side of the circuit board;

multi-feed via holes formed in the ground plane element to correspond to the multi-feed ports;

multi-feed via pins inserted into each of the multi-feed via holes; and a reconfigurable feed circuit configured to control a radiation pattern of the driving radiating element by applying feed signals for dual orthogonal channels having a phase difference of 90° to two feed ports selected from among the multi-feed ports;

wherein the reconfigurable feed circuit comprises:

a channel generation circuit configured to receive an input signal from a feed network connected to the reconfigurable feed circuit and generate the dual orthogonal channels having the phase difference of 90°;

a channel branch circuit connected to the channel generation circuit and configured to generate a plurality of first channels and a plurality of second channels;

a switch arrangement circuit configured to select any one of the plurality of first channels and any one of the plurality of second channels; and a channel combining circuit connected to the switch arrangement circuit and configured to physically couple the first channel and the second channel.

2. The antenna element of claim 1, further comprising:

a parasitic radiating element; and a foam spacer installed between the parasitic radiating element and the driving radiating element.

3. The antenna element of claim 1, wherein the reconfigurable feed circuit further comprises a polarization selection switch connected to an input port of the channel generation circuit and configured to select a right-hand circular polarized wave or a left-hand circular polarized wave of an input signal.

4. The antenna element of claim 1, wherein the multi-feed ports are disposed at equally spaced positions in a radial direction or an azimuth direction of the driving radiating element having an axially symmetric structure.

5. The antenna element of claim 1, wherein the reconfigurable feed circuit selects the two feed ports clockwise or counterclockwise from among the multi-feed ports, electrically opens other feed ports among the multi-feed ports, and feeds the two feed ports at a rotation angle interval of 90° in the azimuthal direction on the basis of a center axis of the multi-feed ports such that the two feed ports have the phase difference of 90°.

6. The antenna element of claim 5, wherein the multi-feed ports are disposed at equally spaced positions obtained by dividing 360° in a radial direction of the driving radiating element having an axially symmetric structure by a number of the multi-feed ports, and a feed transmission line length from the other feed ports to an opened switching terminal of the reconfigurable feed circuit is set to n (n is an integer) times 0.5 times a wavelength of a mean operating frequency, or a feed transmission line length from the other feed ports to a closed switching terminal of the reconfigurable feed circuit is set to n times 0.25 times the wavelength of the mean operating frequency.

7. An array antenna comprising:

a radiation array in which a plurality of antenna elements are arranged; and a feed circuit network including a plurality of reconfigurable feed circuits separately connected to the plurality of antenna elements, wherein each of the plurality of antenna elements comprises:

a driving radiating element formed on one side of a circuit board;

multi-feed ports formed to the driving radiating element, and each of the plurality of reconfigurable feed circuits applies a feed signal for dual orthogonal channels having a phase difference of 90° to dual orthogonal feed ports selected from among the multi-feed ports of each of the driving radiating elements;

wherein each of the plurality of reconfigurable feed circuits comprises:

a channel generation circuit configured to receive an input signal from a feed network connected to the plurality of reconfigurable feed circuits and generate the dual orthogonal channels having the phase difference of 90°;

a channel branch circuit connected to the channel generation circuit and configured to generate a plurality of first channels and a plurality of second channels;

a switch arrangement circuit configured to select any one of the plurality of first channels and any one of the plurality of second channels; and a channel combining circuit connected to the switch arrangement circuit and configured to physically couple the first channel and the second channel.

8. The array antenna of claim 7, wherein each of the plurality of antenna elements further comprises:

a parasitic radiating element; and a foam spacer installed between the parasitic radiating element and the driving radiating element.

9. The array antenna of claim 7, wherein each of the plurality of reconfigurable feed circuits further comprises a polarization selection switch connected to an input port of the channel generation circuit and configured to select a right-hand circular polarized wave or a left-hand circular polarized wave of an input signal.

10. The array antenna of claim 7, further comprising an antenna control unit configured to apply control signals for controlling operation timings of the plurality of reconfigurable feed circuits and data signals for controlling operation modes of the plurality of reconfigurable feed circuits to the plurality of reconfigurable feed circuits.

11. The array antenna of claim 10, wherein the antenna control unit changes or reconfigures the dual orthogonal feed ports among the plurality of feed ports of each of the driving radiating elements by controlling each of the plurality of reconfigurable feed circuits, electrically opens other feed ports among the plurality of feed ports, and generates a relative phase shift due to a changed or reconfigured dual orthogonal feed.

12. The array antenna of claim 10, wherein the radiation array has a structure in which a plurality of driving radiating elements having an M-bit ($2^M$ is the number of the plurality of feed ports) phase shifter function are arranged in a line or on a plane, and the antenna control unit controls phases by separately controlling the plurality of driving radiating elements and performs an electron beam scanning function through uniform or non-uniform amplitude distribution or coupling of a plurality of radiating elements performed by the plurality of reconfigurable feed circuits.

13. An operating method of an array antenna, comprising:

applying feed signals having a phase difference of 90° to two feed ports selected from among a plurality of reconfigurable feed ports attached to each of a plurality of driving radiating elements of antenna elements;

electrically opening other feed ports which are not selected from among the plurality of reconfigurable feed ports from the driving radiating element;

generating a relative phase shift at the plurality of driving radiating elements due to a dual orthogonal feed to the plurality of reconfigurable feed ports to be controlled a phase of the array antenna through separate control of the driving radiating elements;

before the applying of the feed signals:

receiving an input signal from a feed network connected to a plurality of reconfigurable feed circuits and forming dual orthogonal channels having the phase difference of 90°;

causing the dual orthogonal channels to branch into a plurality of first channels and a plurality of second channels;

selecting one of the plurality of first channels and one of the plurality of second channels according to a predetermined rule; and generating the feed signals by physically coupling the selected first channel and the selected second channel.

14. The operating method of an array antenna of claim 13, further comprising selecting a right-hand circular polarized wave or a left-hand circular polarized wave from an input signal.

15. The operating method of an array antenna of claim 13, wherein the controlling of the phase of the array antenna comprises applying control signals for controlling operation timings of a plurality of reconfigurable feed circuits and data signals for controlling operation modes of the plurality of reconfigurable feed circuits to the plurality of reconfigurable feed circuits.

16. The operating method of an array antenna of claim 15, wherein the controlling of the phase of the array antenna comprises changing or reconfiguring the two feed ports among the plurality of feed ports of each of the driving radiating elements by controlling each of the plurality of reconfigurable feed circuits, electrically opening the other feed ports among the plurality of feed ports, and generating a relative phase shift due to a changed or reconfigured dual orthogonal feed.

* * * * *